(12) United States Patent
Jung et al.

(10) Patent No.: US 11,650,005 B2
(45) Date of Patent: May 16, 2023

(54) COMPOSITE FILM FOR HOME APPLIANCE AND REFRIGERATOR WITH COMPOSITE FILM ATTACHED

(71) Applicant: LG Electronics Inc., Seoul (KR)

(72) Inventors: Hyungi Jung, Seoul (KR); Youngjin Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 17/172,966

(22) Filed: Feb. 10, 2021

(65) Prior Publication Data

US 2021/0254885 A1 Aug. 19, 2021

(30) Foreign Application Priority Data

Feb. 19, 2020 (KR) .................. 10-2020-0020716

(51) Int. Cl.
| | |
|---|---|
| *B32B 3/00* | (2006.01) |
| *F25D 23/06* | (2006.01) |
| *B32B 15/09* | (2006.01) |
| *B32B 3/30* | (2006.01) |
| *B32B 3/26* | (2006.01) |
| *B32B 17/00* | (2006.01) |
| *B32B 7/12* | (2006.01) |
| *B32B 27/36* | (2006.01) |

(52) U.S. Cl.
CPC ............ *F25D 23/066* (2013.01); *B32B 3/263* (2013.01); *B32B 3/30* (2013.01); *B32B 7/12* (2013.01); *B32B 15/09* (2013.01); *B32B 17/00* (2013.01); *B32B 27/36* (2013.01); *B32B 2307/402* (2013.01); *B32B 2307/412* (2013.01); *B32B 2509/10* (2013.01)

(58) Field of Classification Search
CPC .... B32B 3/00; B32B 3/10; B32B 3/26; B32B 3/263; B32B 3/30
See application file for complete search history.

(56) References Cited

U.S. PATENT DOCUMENTS

2017/0282529 A1* 10/2017 Hohberg ................. B32B 27/32
2018/0264489 A1* 9/2018 Tsuchibuchi ............ B32B 27/00

FOREIGN PATENT DOCUMENTS

| JP | 2004175106 A | * | 6/2004 | ............ B32B 15/08 |
|---|---|---|---|---|
| KR | 1020090019317 | | 2/2009 | |
| KR | 20090045448 A | * | 5/2009 | |
| KR | 1020090080618 | | 7/2009 | |

* cited by examiner

*Primary Examiner* — Elizabeth E Mulvaney
(74) *Attorney, Agent, or Firm* — Fish & Richardson P.C.

(57) ABSTRACT

A composite film for a home appliance according to an embodiment of the present invention includes a first film part partially formed of metal material and forming an outer appearance, a second film part formed on one surface of the first film part and formed of resin material, an adhesive part formed on one surface of the second film part and adhering to injection products constituting the home appliance, and a plurality of exhaust grooves that are recessed in the adhesive part and extend from one end to the other end of the adhesive part to discharge air between the adhesive part and the injection products.

20 Claims, 16 Drawing Sheets

COMPOSITE FILM FOR HOME APPLIANCE AND REFRIGERATOR WITH COMPOSITE FILM ATTACHED

CROSS-REFERENCE TO RELATED APPLICATIONS

The present application claims priority under 35 U.S.C. 119 and 35 U.S.C. 365 to Korean Patent Application No. 10-2020-0020716, filed on Feb. 19, 2020, the disclosure of which is hereby incorporated by reference in its entirety.

TECHNICAL FIELD

The present invention relates to a composite film for a home appliance and a refrigerator with the composite film attached.

BACKGROUND

In general, the outer appearance of a home appliance such as a refrigerator, an air conditioner, a washing machine, an oven, or the like is formed of plastic or metal material. This home appliance has recently been formed to have a variety of colors, patterns, and textures to meet the various needs and trends of users.

In particular, the home appliance using metal material such as aluminum to make the outer appearance thereof stand out is being preferred, and a metal material is used to form all or a part of the outer appearance of the home appliance.

Recently, the metal material is also used for an internal case forming the interior of the home appliance.

In general, a refrigerator is divided into a refrigerating chamber and a freezing chamber, and a door is installed in front of the refrigerator to preserve cold air in the refrigerating chamber and the freezing chamber. In addition, the refrigerator has the characteristics that cold air has to be circulated for a long time in the refrigerator, in particular, in the case of a storage space such as a refrigerating chamber.

The refrigerating chamber and the freezing chamber in the conventional refrigerator were made of polymer material such as plastics. When the interior of the refrigerator is made of plastic, as in a conventional refrigerator, since the interior of the refrigerator may be easily contaminated in the process of the user putting or taking out stored goods in the interior of the refrigerator, there is a problem in that the interior of the refrigerator has to be frequently cleaned by the user.

In addition, when the amount of cold air received in the interior of the refrigerator is small, there is a problem that the freshness of the food does not last long.

In order to solve the above problems, a refrigerator in which metal material is plated on plastic in the interior of the refrigerator, or a refrigerator in which a part of the wall in the interior of the refrigerator is made of metal has been released.

Republic of Korea Laid-Open Patent Publication No. 10-2009-0080618 discloses a refrigerator in which a metal plate is coupled to the interior of the refrigerator.

However, the refrigerator as described above has a problem in that the material cost ratio is high because a metal plate is used with a certain thickness, and there is a problem that a structure for coupling is additionally required because the refrigerator is formed of a heavy metal material.

In order to solve this problem, Republic of Korea Laid-Open Patent Publication No. 10-2009-0019317 discloses a refrigerator in which an exterior film having a metallic texture is attached to form an outer appearance thereof.

However, in the refrigerator as described above, when the film is attached to a wide surface, it is inevitable that air bubbles are generated between the attachment surface and the film, and problems such as bending of the outer appearance due to the generation of air bubbles may occur.

In addition, problems such as bending of the outer appearance may occur due to the generation of air bubbles due to exposure to a high-temperature environment, temperature change, or expansion of the solvent contained in the adhesive.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

An object of an embodiment of the present invention is to provide a composite film for a home appliance and a refrigerator with the composite film attached in which the quality of the outer appearance thereof is improved by facilitating air discharge from an adhesive surface.

An object of an embodiment of the present invention is to provide a composite film for a home appliance and a refrigerator with the composite film attached in which the attachment workability thereof is improved by allowing the composite film to be attached manually without additional equipment.

An object of an embodiment of the present invention is to provide a composite film for a home appliance and a refrigerator with the composite film attached in which productivity is improved by enabling pattern processing at the same time as cutting processing.

A composite film for a home appliance according to an embodiment of the present invention may include a first film part partially formed of metal material and forming an outer appearance, a second film part formed on one surface of the first film part and formed of resin material, an adhesive part formed on one surface of the second film part and adhering to injection products constituting the home appliance, and a plurality of exhaust grooves that are recessed in the adhesive part and extend from one end to the other end of the adhesive part to discharge air between the adhesive part and the injection products.

Both ends of the exhaust groove may be opened from both ends of the composite film.

The exhaust groove may be disposed at equal intervals over the entire adhesive part.

The width of the exhaust groove may be formed to be smaller than the interval between the exhaust groove and an exhaust groove adjacent thereto.

The exhaust groove may extend along a direction in which the width of the composite film is short.

The exhaust groove may be continuously formed at equal intervals along a direction in which the width of the composite film is long.

The adhesive part may include an adhesive layer laminated to the second film part and formed by foamed acrylic foam, and a protective film layer attached to the adhesive layer to protect the adhesive layer, and in which the exhaust groove may be formed by recessing the protective film layer and the adhesive layer.

The protective film layer may be removed when the adhesive layer is attached to the injection products.

The adhesive layer may be formed to a thickness of 0.3 mm to 0.5 mm, and the exhaust groove may have a depth of 0.1 mm to 0.2 mm.

The exhaust groove may maintain the shape thereof even in a state where the adhesive layer adheres to the injection products.

The exhaust grooves may be formed on both surfaces of the adhesive layer and be opened toward the second film part and the injection products.

The first film part may include a metal layer, a PET layer adhering to one surface of the metal layer to protect the surface of the metal layer, a primer layer applied to the other surface of the metal layer and adhering to the second film part, and a coating layer protecting the PET layer, and in which the PET layer may be positioned between the coating layer and the metal layer.

The second film part may be formed of ABS resin and is formed by insert extrusion with the first film part.

On the other aspect, a composite film for a home appliance according to an embodiment of the present invention, in a composite film that is attached to injection products of a home appliance to form an outer appearance, the composite film may include an exterior part representing the outer appearance color and texture of the home appliance, and an adhesive part adhering to one surface of the exterior part and adhering to the outer surface of the injection products constituting the home appliance, in which the adhesive part may be formed with a plurality of exhaust grooves recessed to open toward the outer surfaces of the injection products, and the exhaust groove may extend from one end to the other end of the composite film and discharge air between the adhesive part and the injection products to both opened ends of the composite film.

The exterior part may include a transparent layer formed of a transparent glass or plastic material and a printing layer on which a specific color, pattern, shape, character, or the like is printed on the transparent layer and adheres to the adhesive layer.

The exterior part may be formed of film material.

A refrigerator with a composite film attached according to an embodiment of the present invention may include a cabinet forming a storage space, a door that opens and closes a front surface of the storage space and is rotatably provided on one side of the cabinet, and a grill pan that forms a rear wall of the storage space and has a cold air discharge hole for discharging cold air to the storage space, in which the grill pan may include a grill pan body composed of injection products, and a composite film attached to a front surface of a grill pan body.

The grill pan may have a body opening for discharging cool air into the storage space, and the composite film may have a film opening cut in a position corresponding to the body opening.

A refrigerator with a composite film attached according to an embodiment of the present invention may include a cabinet forming a storage space, and a door that opens and closes a front surface of the storage space and is rotatably provided on one side of the cabinet, in which a composite film may be attached to the front surface of the door.

A refrigerator with a composite film according to an embodiment of the present invention may include a cabinet forming a storage space, and a door that opens and closes the front surface of the storage space and is rotatably provided on one side of the cabinet, in which a composite film described above may be attached to an inner surface of the storage space.

A method for manufacturing a composite film for a home appliance according to an embodiment of the present invention includes manufacturing a first film part partially formed of a metal material [S10], molding an extruded sheet by adhesion a second film part made of the ABS resin material with the first film part when extruding [S20]; forming a composite film fabric by laminating the adhesive part on a lower surface of the extruded sheet [S30]; and forming an exhaust groove in the adhesive part by processing the composite film fabric with a press device and cutting the composite film fabric to shape a composite film [S40], in which, in step [S40], the exhaust groove may extend from one end to the other end of the composite film and may be formed on the entire surface of the adhesive part at equal intervals.

In step [S40], the composite film fabric is continuously supplied in a roll state, so that the exhaust groove may be continuously formed and cut.

In step [S40], the press device is provided with a pattern mold for forming the exhaust groove and a cutting mold for cutting into the shape of the composite film, and the press device can press the supplied composite film fabric with the pattern mold and then continuously press the supplied composite film fabric with the cutting mold.

In step [S40], the press device may form the exhaust groove while the protective film of the adhesive part is attached and pressurize the protective film to maintain the shape of the exhaust groove even when the protective film is removed.

DETAILED DESCRIPTIONS

Hereinafter, embodiments of the present invention will be described in detail with reference to the accompanying drawings so that a person skilled in the art may easily implement the present invention. The present invention may be implemented in a number of different forms and is not limited to the structure or method described herein.

In one embodiment of the present invention below, for convenience of explanation, a structure in which a composite film is applied to the rear wall of the interior of a refrigerator in which a storage space is formed is described, but it is noted that the composite film of the present invention can be applied to any of the refrigerating chamber and the freezing chamber of a refrigerator and the application is not limited to the shape of the refrigerator.

Additionally, the composite film of the present invention can be applied to a home appliance in which metal material is used in addition to the refrigerator.

Figure 1:
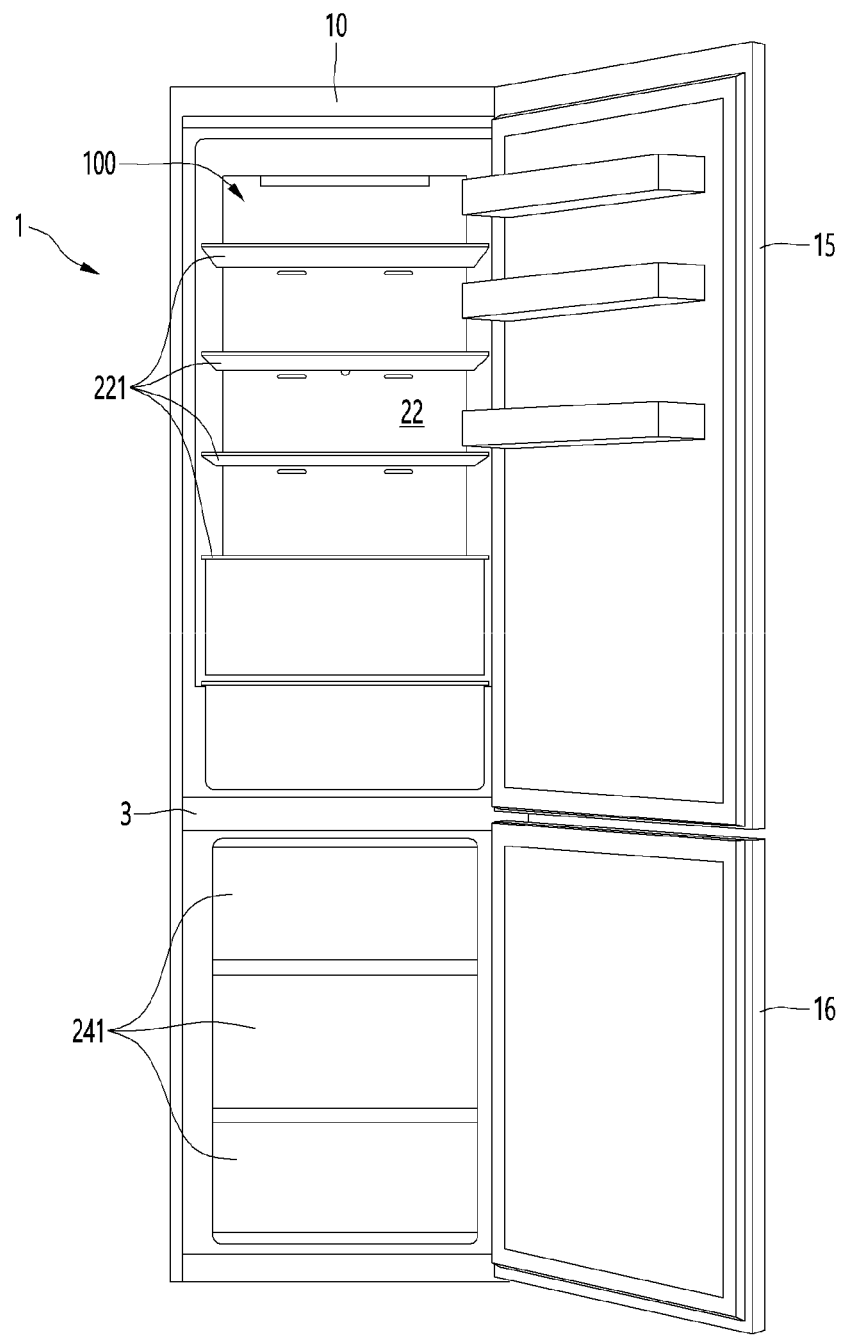
FIG. 1 is a view illustrating a state where a door of a refrigerator to which a composite film according to an embodiment of the present invention is applied is opened.
Figure 2:
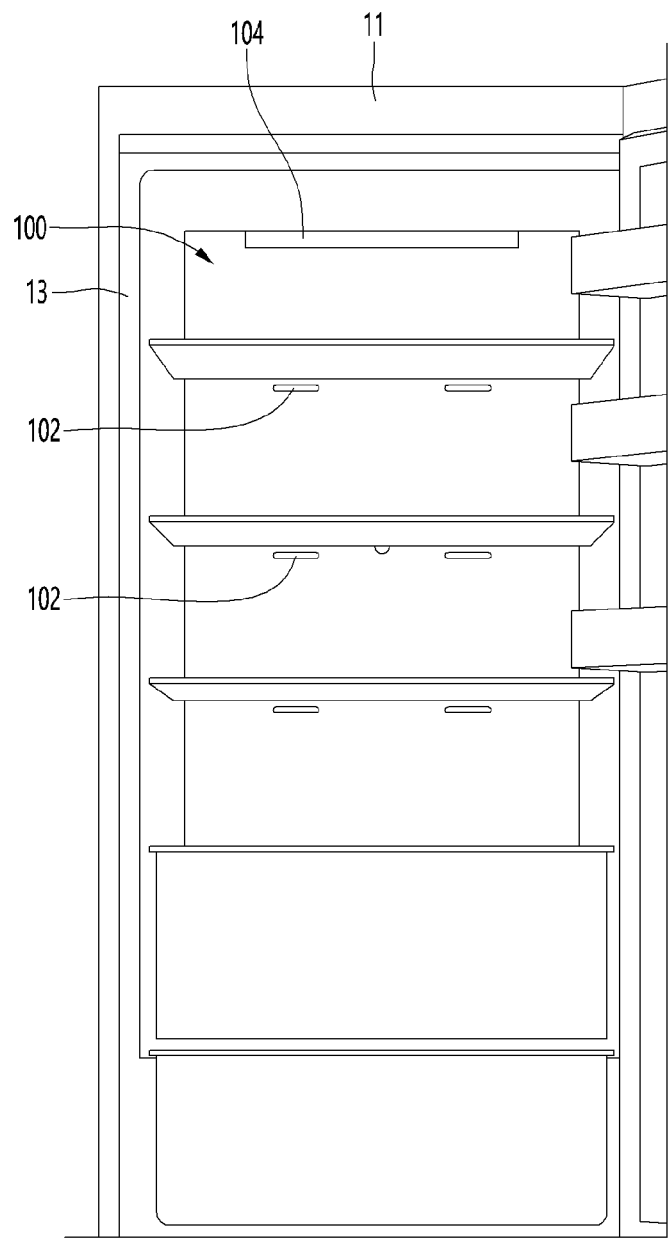
FIG. 2 is a view illustrating the interior of the storage space of the refrigerator.
Figure 3:
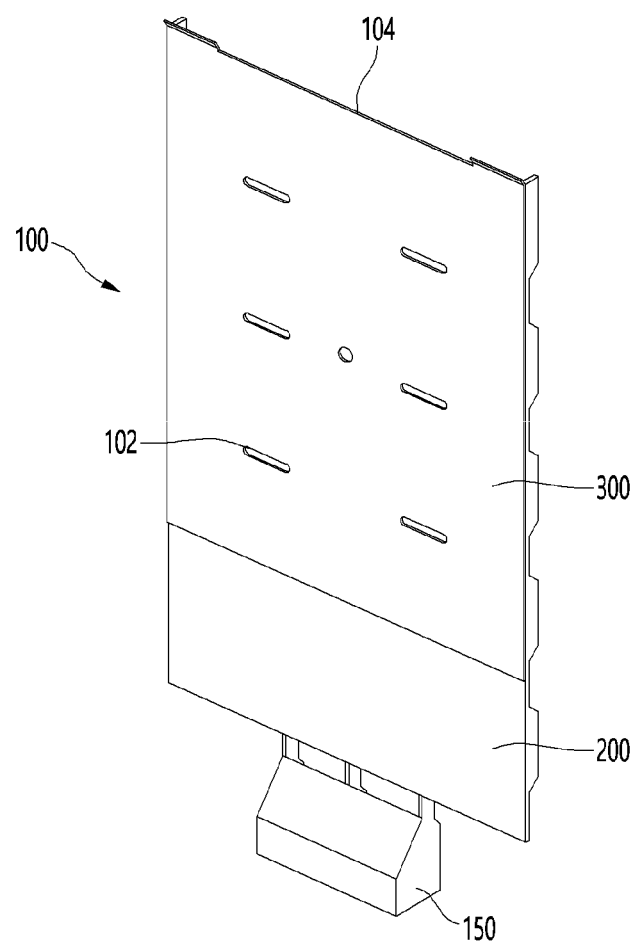
FIG. 3 is a perspective view illustrating a grill pan to which the composite film is applied.
Figure 4:
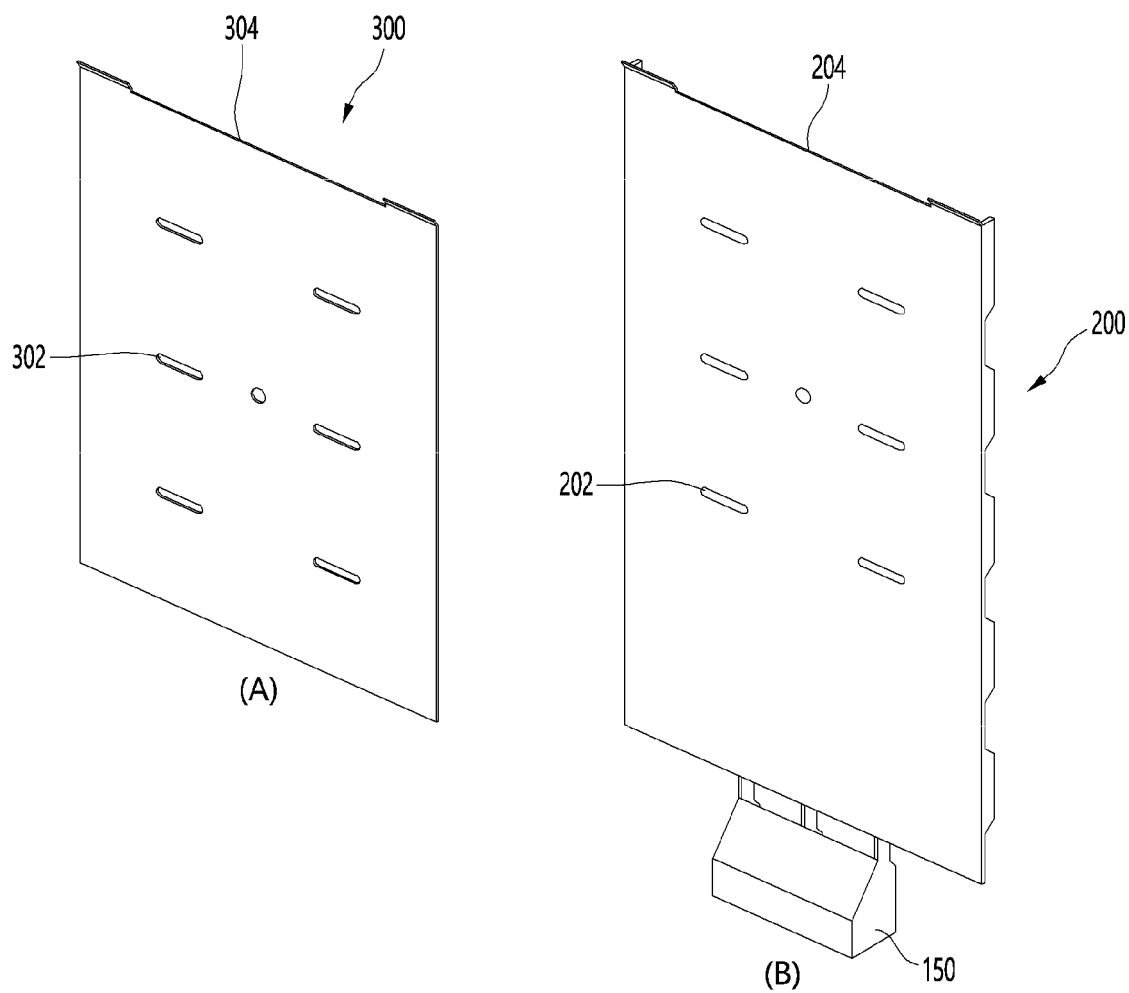
FIG. 4 is an exploded perspective view illustrating a state where the composite film and the grill pan body are separated.

FIG. 1 is a view illustrating a state where a door of a refrigerator to which a composite film according to an embodiment of the present invention is applied is opened, FIG. 2 is a view illustrating the interior of the storage space of the refrigerator, FIG. 3 is a perspective view illustrating a grill pan to which the composite film is applied, and FIG. 4 is an exploded perspective view illustrating a state where the composite film and the grill pan body are separated.

Referring to FIGS. 1 to 4, the refrigerator 1 according to an embodiment of the present invention may include a cabinet 10 in which the storage space 20 is formed, and doors 15, 16 which are rotatably installed at one side of the cabinet 10 and selectively open and close the storage space.

The storage space 20 may be divided vertically by a barrier 3, a refrigerating chamber 22 may be formed in the upper part of the cabinet 10, and a freezing chamber 24 may be formed in the lower part of the cabinet 10.

Various types of receiving members 221 such as shelves, drawers, and baskets may be provided inside the refrigerating chamber 22. If necessary, the receiving member 221 may be pulled in and out in a state where the door is opened, and the stored goods may be received and stored by pulling the receiving member in and out.

Inside the freezing chamber 24, a freezing chamber receiving member 241 having a drawer shape that can be withdrawn may be mainly disposed and the freezing chamber receiving member 241 is connected to the opening of the doors 15 and 16 so that the freezing chamber receiving member 241 can be configured to be pulled in and out.

The doors 15 and 16 may include a refrigerating chamber door 15 for selectively opening and closing a storage space of the refrigerating chamber 22 and a freezing chamber door 16 for selectively opening and closing a storage space of the freezing chamber 24.

The cabinet 10 may include an outer case 11 constituting the exterior, and an inner case 13 installed with a predetermined space with the outer case 11 and constituting the interior of the refrigerating chamber 22 and the freezing chamber 24. Insulating material (not illustrated) may be provided in the space between the outer case 11 and the inner case 13.

FIG. 1 illustrates, for example, a bottom freezer type in which a freezing chamber is provided below, but naturally the present invention can be applied to various types such as a side by side type in which the refrigerating chamber and the freezing chamber are divided into left and right sides, and a top-mount type in which the freezing chamber is provided above, in addition to the bottom freezer type refrigerator.

The refrigerator 1 may have an evaporating chamber provided with an evaporator (not illustrated) for generating cold air, a cold air flow path through which cold air generated in the evaporating chamber moves to the storage space, and a cold air suction flow path in which cold air inside the storage space moves to the evaporating chamber.

The evaporating chamber, the cold air flow path, and the cold air suction flow path may be positioned inside the inner wall of the storage space.

The refrigerator 1 may further include a grill pan 100 forming one wall of the storage space 20.

One wall of the storage space 20 may be defined by the grill pan 100.

For example, the grill pan 100 may define a rear wall of the storage space 20. In detail, the grill pan 100 can be positioned between the storage space 20 and the rear wall of the inner case 13.

Hereinafter, an example in which the grill pan 100 is formed in the refrigerating chamber 12 will be described. However, it should be noted that the grill pan 100 can also be formed in the freezing chamber 14.

The rear wall of the refrigerating chamber 22 may be entirely or at least partially formed by the grill pan 100. The cold air flow path may be formed at the rear side of the grill pan 100.

A cold air discharge hole 102 through which the cold air moved through the cold air flow path is discharged may be perforated in the grill pan 100. A plurality of cold air discharge holes 102 may be formed vertically, and a plurality of cold air discharge holes 102 may be formed on both left and right sides.

The grill pan 100 may have a cold air discharge port 104 formed at an upper end thereof. The cold air discharge port 104 may be formed to be elongated in the right and left direction. The cold air moved through the cold air flow path may be discharged above the refrigerating chamber 22 through the cold air discharge port 104.

The grill pan 100 may have a substantially rectangular plate shape on the rear wall of the refrigerating chamber 22. However, the shape of the grill pan is not limited to the rectangular shape and is sufficient as long as the grill pan forms the rear wall of the storage space 20.

The grill pan 100 may include a grill pan body 200 having the shape of the grill pan 100 and a composite film 300 coupled to an upper surface of the grill pan body 200.

Here, the grill pan 100 is assembled in a refrigerator in a vertically erected state, and an upper surface of the grill pan body forms a rear surface of the refrigerating chamber. Accordingly, the upper surface of the grill pan 100 may be understood as a surface facing the front of the refrigerator 1 that is opened by the doors 15 and 16 after assembly.

In other words, the direction of the upper surface is a direction in which the grill pan 100 faces the storage space 20, and a surface facing the opposite direction to the upper surface of the grill pan 100 is a lower surface.

Hereinafter, a direction toward the outside of the refrigerator based on the doors 15 and 16 may be defined as a front, and a direction toward the inside of the refrigerator may be defined as a rear. For example, the grill pan 100 may be positioned behind the receiving member 221 of the refrigerating chamber 22.

The refrigerator 1 may further include a cooling fan assembly 150 positioned below the grill pan body 200. The cold air fan assembly 150 may serve to suck cold air from the evaporating chamber and move the cold air to the cold air flow path.

The cooling fan assembly 150 may be provided below the grill pan body 200.

The cooling fan assembly 150 may include a cooling fan motor (not illustrated) and a cooling fan (not illustrated). The cold air sucked in by the driving of the cold air fan may be guided to the cold air flow path.

The grill pan body 200 and the cooling fan assembly 150 may be integrally formed.

The grill pan body 200 may be provided in a shape that forms one wall of the storage space 20. In other words, the shape of one wall of the storage space 20 may be formed by the shape of the grill pan body 200.

The grill pan body 200 may be injection molded. In detail, the grill pan body 200 may be injection-molded from plastic material.

In the grill pan body 200, in a position corresponding to the cold air discharge hole 102 and the cold air discharge port 104, to form the cold air discharge hole 102 and the cold air discharge port 104 of the grill pan 100, body openings 202 and 204 may be formed.

In the composite film 300, film openings 302 and 304 may be formed at positions corresponding to the body openings 202 and 204 in order to form the cold air discharge holes 102 and the cold air discharge ports 104 of the grill pan 100.

In other words, when attaching the composite film 300 to the grill pan body 200, the body openings 202 and 204 and the film openings 302 and 304 may be aligned to form the cold air discharge hole 102 of the grill pan 100.

The grill pan 100 may include a round part 106 provided at an upper end. The round part 106 may be formed to be rounded toward the front as it goes upward.

The round parts 106 may be provided on both sides of the cold air discharge port 104. The grill pan 100 can be easily coupled to a wall other than the rear wall of the refrigerating chamber 22 by the round part 106.

The cold air may be prevented from flowing out of the storage space 20 by the round part 106, and the flow of the cold air discharged to the storage space 20 may be smooth.

The composite film 300 and the grill pan body 200 may further include round parts 306 and 206 at an upper end. The round parts 306 and 206 may be positioned on both sides of the openings 204 and 304 to form the round part 106 of the grill pan 100 when the composite film 300 and the grill pan body 200 adhere.

The round parts 306 and 206 may be formed to be rounded toward the front as it goes upward to form the round part 106 of the grill pan 100.

Figure 5:
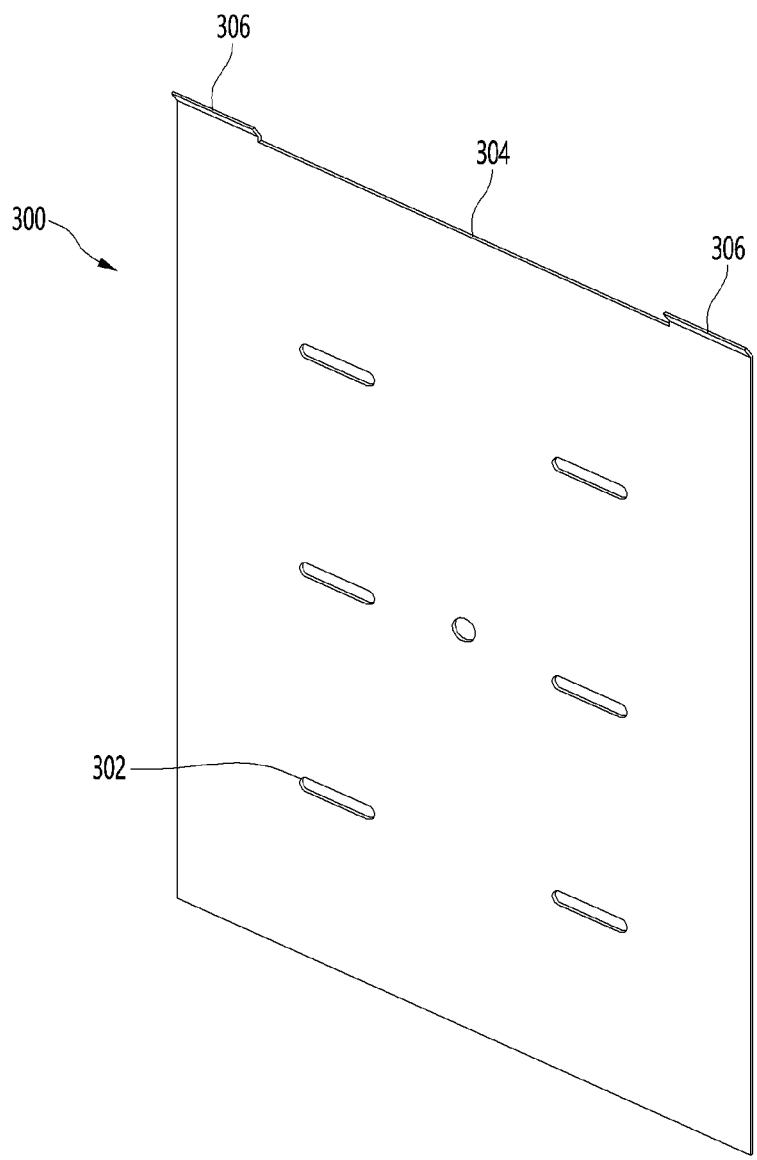
FIG. 5 is a perspective view illustrating the composite film.
Figure 6:
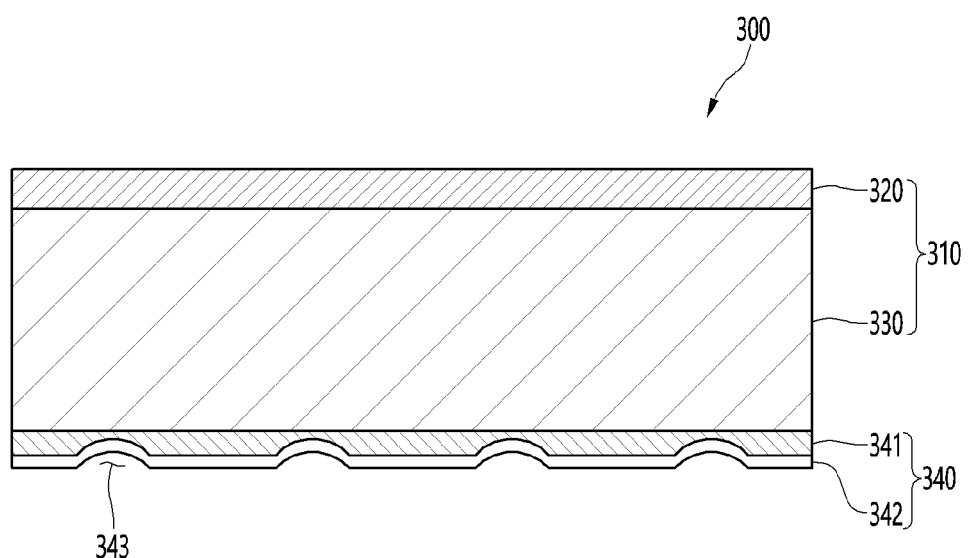
FIG. 6 is a sectional view illustrating the configuration of the composite film.
Figure 7:
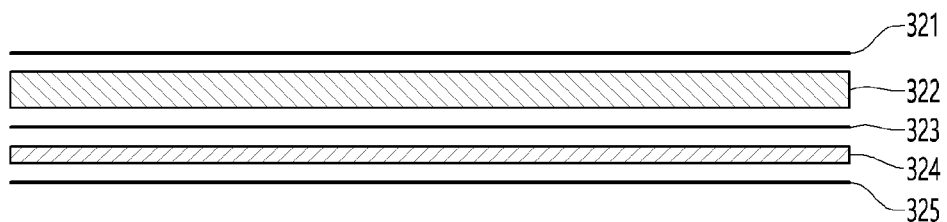
FIG. 7 is a view illustrating the configuration of a first film part of the composite film.

FIG. 5 is a perspective view illustrates the composite film, FIG. 6 is a sectional view illustrating the configuration of the composite film, and FIG. 7 is a view illustrating the configuration of the first film part of the composite film.

Referring to FIGS. 5 to 7, the composite film 300 may be provided in a sheet shape.

The composite film 300 may include a first film part 320, a second film part 330, and an adhesive part 340. The first film part 320 may be positioned on an upper surface of the second film part 330.

In detail, when the composite film 300 is attached to the grill pan body 200, the second film part 330 may be positioned between the first film part 320 and the grill pan body 20.

The first film part 320 and the second film part 330 may be integrally formed by insert extrusion. The insert extrusion method will be described below.

The first film part 320 may be configured to be relatively thinner than the second film part 330.

The first film part 320 may be formed to have a minimum thickness capable of implementing a metallic texture. The first film part 320 may be formed to have a thickness of approximately 34 to 67 μm.

For example, the first film part 320 may be formed to a thickness of 49 μm.

The first film part 320 may include a coating layer 321, a PET layer 322 positioned on the lower surface of the coating layer 321, an adhesive layer 323 positioned on the lower surface of the PET layer 322, a metal layer 324 positioned on the lower surface of the adhesive layer 323, and a primer layer 325 formed on the lower surface of the metal layer 324.

In other words, it may be understood that the metal layer 324 covers the primer layer 325, the adhesive layer 323 covers the metal layer 324, the PET layer 322 covers the adhesive layer 323, and the coating layer 321 covers the PET layer 322.

The coating layer 321 may be provided on the foremost or above the first film part 320. The coating layer 321 prevents the hairline of the first film part 320 to be damaged, which will be described below, and improves scratch resistance and hardness of the composite film 300.

The coating layer 321 may be formed by coating an acrylic resin coating solution. The acrylic resin is easy to coat material requiring processing.

The coating layer 321 may be formed to be thinner than the PET layer 322. The coating layer 321 may be formed to a thickness of approximately 1 to 4 μm. For example, the coating layer 321 may be formed to a thickness of 1 μm.

The PET layer 322 may be provided to protect the metal layer 324. Corrosion of the metal layer 324 by moisture penetration into the metal layer 324 may be prevented by the PET layer 322.

The surface of the metal layer 324 may be protected by the PET layer 322. The basket and the first film part 320 are likely to collide with each other in the process of the user pulling in and out the basket in which the storage material is contained above the receiving member 221, and, by the PET layer 322, the metal layer 324 can be prevented from being damaged and the metal texture can be exhibited better.

The PET layer 322 may be made of polyethylene terephthalate (PET).

The PET layer 322 may be formed thicker than the coating layer 321. The thickness of the PET layer 322 may be approximately 20 to 40 μm. For example, the PET layer 322 may be formed to a thickness of 30 μm.

The adhesive layer 323 is for adhesion of the PET layer 322 to the metal layer 324 and may be provided on the lower surface of the PET layer 322. The adhesive layer 323 may be applied to a thickness of 6 to 10 μm for laminating the PET layer 322 and the metal layer 324, and the adhesive state between the PET layer 322 and the metal layer 324 can be maintained. Of course, if the metal layer 324 is formed by vapor deposition or the like, the adhesive layer 323 may be omitted.

The metal layer 324 may be provided with a thickness thinner than that of the PET layer 322. The metal layer 324 may be formed to have a thickness of about 12 to 22 μm to represent the metal texture of the composite film 300.

For example, the metal layer 324 may be formed to a thickness of 17 μm.

The metal layer 324 may be formed of an aluminum layer.

Conventionally, a metal plate is attached to the plastic injection product to realize the metal texture of the grill pan, and in this case, there is a problem that, since the metal plate has a relatively high density, the metal plate is heavy and in order to attach the metal plate to the plastic injection product while withstanding the weight thereof, a support structure such as a bending part and a hole for coupling with the plastic injection product is essentially required to the metal plate.

When the metal texture of the grill pan 100 is implemented using the thin metal layer 324 as in the embodiment of the present invention, there is an effect that the material cost is greatly reduced and the weight for implementing the metal texture is greatly reduced. Therefore, a structure of separate coupling with the grill pan body 200 made of the plastic injection product is not required, and the composite film 300 simply molded in a sheet shape is attached to the grill pan body 200, and thus the configuration of the grill pan 100 becomes possible.

In addition, since the grill pan body 200 also does not require a separate coupling structure, there is an advantage that the structure of the grill pan body 200 is also simplified.

The primer layer 325 may be provided on the lower surface of the metal layer 324 to facilitate coupling with the second film part 330.

When the first film part 320 and the second film part 330 are coupled using an adhesive, an adhesive should be provided on the lower surface of the primer layer 325. However, since the first film part 320 and the second film part 330 of the composite film 300 according to the embodiment of the present invention are integrally coupled by insert extrusion to be described below, there is an advantage that an adhesive is not required for the first film part 320.

In addition, since there is no need to provide an adhesive to the first film part 320, the thickness of the composite film 300 may be relatively thin and the weight thereof may be reduced.

In other words, the composite film 300 can be easily coupled to the grill pan body 200 and the composite film 300 can be maintained for a long time.

The primer layer 325 may have a thickness of approximately 1 μm or less.

In the first film part 320, a hairline may be formed to maximize the texture of metal in order to luxuriously implement the interior of the refrigerating chamber 22, which is seen when the user opens the doors 15 and 16.

The hairline may be formed on the metal layer 324. In this case, the hairline may be formed by scraping the surface of the metal layer 324.

Alternatively, the hairline may be formed on the PET layer 322. The hairline may be directly formed on the PET layer 322.

Alternatively, the hairline may be formed by ultraviolet (UV) curing after imprinting with a molding roller having a hairline formed on a UV curable resin composition applied to the PET layer 322.

Specifically, a liquid UV curable resin is applied to the surface of the PET layer 322, and then a mold having a desired pattern formed in an embossed shape and the PET layer 322 are aligned with each other and the mold is pressed against the applied UV curable resin. Thereafter, when the UV is projected while heating and curing, a hairline is formed in an engraved shape on the surface of the PET layer 322.

When the hairline is formed as described above, the gloss peculiar to the metal is partially reduced so that it is not conspicuous even if there is a crack or the like, and at the same time, it causes the diffuse reflection of light due to the fine curvature of the hairline to make the outer appearance look beautiful.

Since the first film part 320 implements a metal texture by the metal layer 324, the first film part may be defined as a "metal film part".

By the first film part 320 according to an embodiment of the present invention, the interior of the refrigerator 1 looks like excellent in outer appearance and it is easy to maintain the temperature in the refrigerator by allowing the cold air in the refrigerator to be easily circulated.

If the inner case 13 is made of only a plastic resin material, preservation of cold air may be weak. In detail, there is a problem that, when the doors 15 and 16 of the refrigerator 1 are opened, external air that is relatively higher than the temperature in the refrigerator 1 flows into the refrigerator, and the temperature in the refrigerator increases due to mixing the flowing external air and the cold air in the refrigerator.

On the other hand, when the metal layer 324 is provided on the first film part 320 as in an embodiment of the present invention, the cold air flowing through the cold air flow path easily circulates and the cold air accumulates in the refrigerator, and even if external air flows into the refrigerator, it is possible to prevent the temperature in the refrigerator from increasing through heat exchange with the accumulated cold air.

The second film part 330 may be understood as a configuration constituting the base of the composite film 300.

The second film part 330 may be made of ABS resin. In detail, the second film part 330 may be formed by extrusion of ABS resin.

The second film part 330 may be formed to have a thickness for maintaining the strength and shape of the composite film 300. The second film part 330 may have a thickness of 0.40 mm to 0.60 mm.

For example, the second film part 330 may be formed to a thickness of 0.5 mm.

Damage to the first film part 320 can be prevented by the second film part 330 and the first film part 320 can be easily maintained.

In detail, the metallic texture that appears as the outer appearance of the composite film 300 is implemented in the first film part 320, and the maintenance of the strength and shape of the composite film 300 mainly comes true by the second film part 330.

Accordingly, the first film part 320 has a minimum thickness capable of implementing a metal texture and may be formed to be relatively thinner than the second film part 330, and the second film part 330 may prevent the outer appearance of the first film part 320 from being damaged such as being wrinkled or folded, or the like when the composite film 300 is attached to the grill pan body 200 (injection product) by maintaining an appropriate thickness.

The second film part 330 may come into contact with the primer layer 325 of the first film part 320 in the process of being pressed with the first film part 320 by insert extrusion. The second film part 330 and the metal layer 324 may be easily thermally fused when being pressed by extrusion heat during the insert extrusion process by the primer layer 325.

Since the second film part 330 is thermally fused together with the second film part 310 by extrusion heat, the composite film 300 is implemented in a sheet shape so that the composite film 300 can be easily processed.

The second film part 330 may be formed by extruding a base resin (ABS), and a detailed description thereof will be described below.

The second film part 330 may hereinafter be defined as "plastic film".

The adhesive part 340 may include an adhesive layer 341 positioned on the lower surface of the second film part 330 and a protective film layer 342 that protects the adhesive layer 341.

The adhesive part 340 may be formed after forming the first film part 320 and the second film part 330 by an insert extrusion process to be described below.

In detail, the adhesive part 340 may be formed by attaching an adhesive layer 341 to the lower surface of the second film part 330. At this time, the adhesive layer 341 may be in a state where one surface thereof is attached by the protective film 342.

The adhesive layer 341 may be formed of compressible material so as to form the exhaust groove 343 during cutting and patterning processing, which will be described below. For example, the adhesive layer 341 may be formed of acrylic foam, processed by foam molding, and attached to the lower surface of the second film part 330. The adhesive layer 341 may be formed to have a thickness of about 0.30 mm to 0.50 mm in order to ensure the molding of the exhaust groove 343 and provide sufficient adhesion. As an example, the adhesive layer 341 may be formed to a thickness of 0.40 mm.

In addition, the protective film 342 may be attached together when the adhesive part 340 is attached to the lower surface of the second film part 330, and the protective film can be removed to attach the composite film 300 to the grill pan body 200.

The adhesive part 340 may be laminated with the extruded sheet 310 by a press roll so that the adhesive layer 341 can be effectively attached to the lower surface of the second film part 330.

Figure 8:
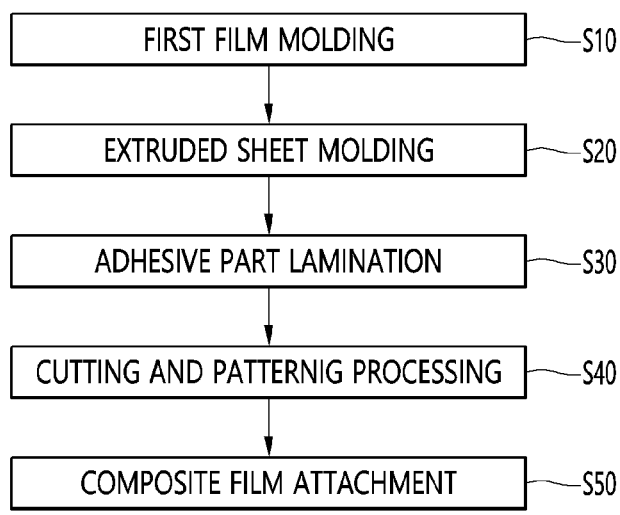
FIG. 8 is a block diagram illustrating step by step a manufacturing process of the composite film.
Figure 9:
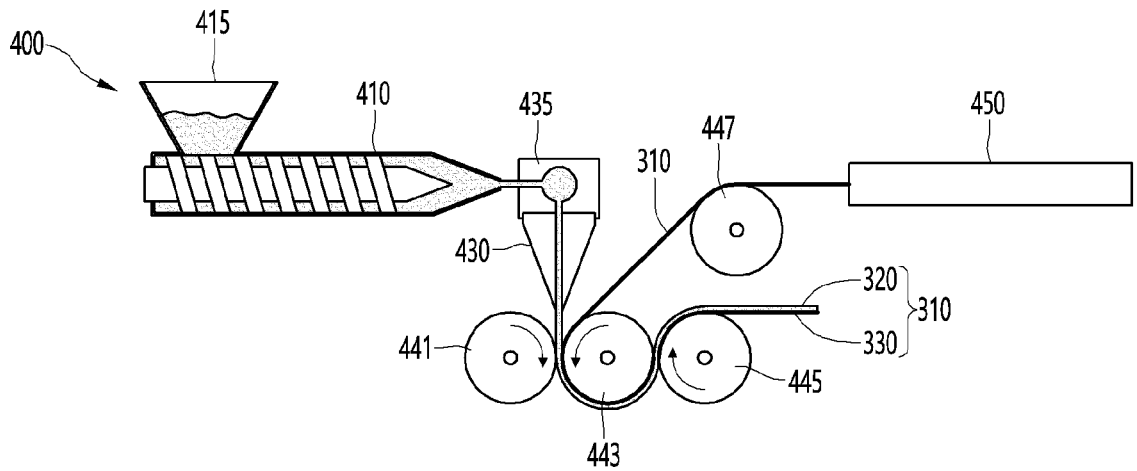
FIG. 9 is a view illustrating a process of manufacturing a first film part and a second film part of the composite film.
Figure 10:
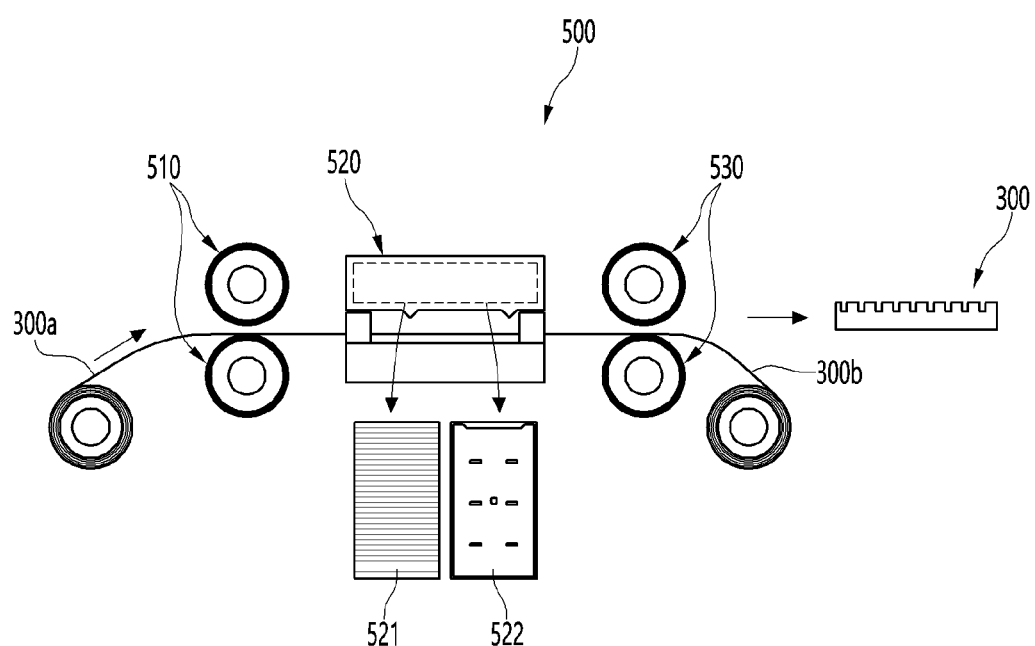
FIG. 10 is a view illustrating processes for cutting and patterning the composite film.

FIG. 8 is a block diagram illustrating step by step a manufacturing process of the composite film, FIG. 9 is a view illustrating a process of manufacturing a first film part and a second film part of the composite film, and FIG. 10 is a view illustrating processes for cutting and patterning the composite film.

In order to manufacture the composite film 300, the first film part 320 is first formed. After the respective layers constituting the first film part 320 are formed, the respective layers are formed to adhere to each other. [S10]

In addition, the molded first film part 320 is continuously supplied in a roll state and is insert-extruded together with the second film part 330 by an extrusion device 400 to be described below, thereby molding the extruded sheet 310. [S20]

The molded extruded sheet 310 may also be provided in a roll state, and the molded extruded sheet 310 can be laminated with an adhesive part 340 composed of a protective film 342 and the adhesive layer 341 made of acrylic foam material to form a rolled composite film fabric 300a. Of course, the adhesive part 340 and the extruded sheet 310 may be continuously laminated. [S30]

The composite film fabric 300a in a roll state may be cut into a final shape for attaching to the grill pan body 200 by passing through a press device 500 to be described below. At this time, the cutting and patterning operations may be performed by the press device 500, and the exhaust groove 343 may be formed by pressing the back surface of the composite film fabric 300a, that is, the adhesive part 340. [S40]

The composite film fabric 300a is cut into a shape attachable to the grill pan body 200 to complete the molding of the composite film 300, and in a state where the exhaust groove 343 is formed on the back surface, the protective film 342 is removed so that the user can manually attach the composite film to the grill pan body 200.

At this time, the user can form the outer appearance of the grill pan 100 in a smooth shape by exhausting air generated when attaching the composite film 300 through the exhaust groove 343 while attaching the composite film 300. [S50]

Hereinafter, with reference to the drawings, the extrusion process and the cutting and patterning processes, which are the main processes, will be described in more detail.

Referring to FIG. 9, the first film part 320 and the second film part 330 of the composite film 300 may be formed by being insert-extruded by the extrusion device 400.

When the second film part 330 is extruded by the extrusion device 400, the first film part 320 is thermally fused to the second film part 330, which is defined as an extruded sheet (see FIG. 9, 310). The process of manufacturing the extruded sheet 310 will be described below.

The extrusion device 400 may include an extruder 410, an input port 415 formed in the extruder 410, a T-die 430 formed at the rear end of the extruder 410, a guide roller unit 441, 442, 445, and 447, and a first film part input device 450.

The extruder 410 may use a screw-type extruder in which a screw for extruding the extruded material is provided on a rotating shaft and rotated, but it is not limited thereto.

The input port 415 may be formed on the upper end of the extruder 410. Extruded material may be input through the input port 415. Here, the extruded material may be a base resin (ABS).

The T-die 430 may be installed at the rear end of the extruder 410. The T-die 430 may mold and extrude the extruded material into a predetermined shape.

The extrusion device 400 may further include a distributor 435 positioned between the rear end of the extruder 410 and the T-die 430. The extruded material of the extruder 410 may first pass through the distributor 435 and be supplied to the T-die 430. A certain amount of extruded material from the extruder 410 may be distributed to the T-die 430 by the distributor 435.

The T-die 430 is configured in an approximately T-shape. In detail, a part of the T-die 430 is formed to be elongated in a straight form, so that it is easy to form a sheet or film.

The extruded material being pulled from the extruder 410 to the T-die 430 through the distributor 435 is diffused in the left and right direction inside the T-die 430 by the straight form and then may be pulled in the transverse direction toward the output part (not illustrated) of the T-die 430.

In this case, the second film part 330 may be formed by outputting the extruded material from the output part of the T-die 430.

The guide roller units 441, 442, 445, and 447 may be positioned at a rear end of the output part of the T-die 430.

While passing through the guide roller units 441, 442, 445, and 447, the second film part 330 and the first film part 320 input from the first film part input device 450 can be thermally fused and pressed into a sheet form to be output.

The extruded sheet 310 in a sheet form may be formed by thermally fusing the second film part 330 to the first film part 320.

The guide roller units 441, 442, 445, and 447 may include a first guide roller 441, a second guide roller 443, and a third guide roller 445. The first guide roller 441 may be disposed on one side of the second guide roller 443, and the third guide roller 445 may be disposed on the other side of the second guide roller 443.

In other words, the second guide roller 443 may be disposed between the first guide roller 441 and the third guide roller 445.

The extruded material (second film part) output from the output part of the T-die 430 may be pulled in a first direction toward a gap between the first guide roller 441 and the second guide roller 443. For example, the first direction may be a vertical direction.

The first guide roller 441 and the third guide roller 445 may rotate in the same direction. For example, the first guide roller 441 and the third guide roller 445 may rotate in a clockwise direction.

The second guide roller 443 may rotate in a direction opposite to the first guide roller 441 and the third guide roller 445. For example, the second guide roller 443 may rotate in a counterclockwise direction.

The second guide roller 443 may have a larger radius than the first guide roller 441 and the third guide roller 445. The extruded material (second film part) output from the output part of the T-die 430 is pulled in the gap between the first guide roller 441 and the second guide roller 443 and can be moved along the surface of the second guide roller 443.

The guide roller units 441, 442, 445, and 447 may further include a fourth guide roller 447 positioned at a side of a discharge port (not illustrated) of the first film part input device 450. The first film part 320 discharged from the first film part input device 450 is moved along the surface of the fourth guide roller 447 and then is pulled in the gap between the first guide roller 441 and the second guide roller 443.

The first film part 320 may be pulled in the gap between the first guide roller 441 and the second guide roller 443 by the fourth guide roller 447 while the tension of the first film part 320 is adjusted. In other words, since the first film part 320 can be inserted tightly by the fourth guide roller 447, the first film part 320 and the second film part 330 can be laminated to a certain thickness.

The first film part 320 may be pulled in a second direction toward the gap between the first guide roller 441 and the second guide roller 443. For example, the second direction may be an oblique direction.

An extruded material (second film part) pulled in the first direction toward the gap between the first guide roller 441 and the second guide roller 443 and the first film part 320 pulled in the second direction may be laminated at a point positioned between the first guide roller 441 and the second guide roller 443.

In this case, the one point may be defined as a laminated point of the second film part 330 and the first film part 320. For example, the laminated point of the second film part 330 and the first film part 320 may be positioned on the surface of the second guide roller 443.

The second film part 330 and the first film part 320 are laminated from the laminated point and then can be moved along the surface of the second guide roller 443 by rotation of the second guide roller 443.

The second film part 330 and the first film part 320 may be thermally fused by extrusion heat applied during the extrusion process of the extruder 410. The heat of extrusion may be approximately 180° C.

Since the first film part 320 and the second film part 330 are of different materials, the first film part 320 and the second film part 330 can adhere using an adhesive, but in this case, a bonding process using an adhesive is essential.

On the other hand, when the first film part 320 and the second film part 330 are thermally fused by the extrusion heat by the extrusion device 400 according to the embodiment of the present invention, since a process step for adhesion may be omitted, manufacturing cost and manufacturing time may be reduced, thereby increasing productivity.

In detail, since the extruded sheet 310 in which the second film part 330 and the first film part 320 are fused/adhere using the extrusion heat generated in the process of extruding the extruded material into the second film part 330 can be manufactured, there is an advantage that additional heat supply is not required.

Here, since the extruded sheet 310 is formed by fusing the first film part 320 and the second film part 330, the extruded sheet 310 may be defined as a "heat-fused sheet".

In addition, in the process of extruding the extruded material to the second film part 330, when heat-fused with the first film part 320, since the first film part 320 and the second film part 330 can be formed integrally, the coupling performance can be increased.

Specifically, the bonding of the first film part 320 and the second film part 330 may be higher than the bonding using an adhesive, and the flatness of the bonded first and second film parts 310 and 350 can be increased.

In other words, the extruded sheet 310 has high coupling strength and flatness compared to the case where the extruded sheet 310 is bonded by an adhesive and thus has the excellent quality, and thus the extruded sheet 310 can be used and maintained for a long time.

The extruded sheet 310 in which the first film part 320 and the second film part 330 moved along the surface of the second guide roller 443 are laminated may be moved along the third guide roller 445.

In detail, since the rotation directions of the second guide roller 443 and the third guide roller 445 are opposite, the extruded sheet 310 moving along the surface of the second guide roller 443 is seated and moved to the surface of the third guide roller 445.

The extrusion device 400 may further include a pressing roller unit (not illustrated) and a transfer unit (not illustrated) installed at the rear end of the guide roller units 441, 442, 445, and 447.

The extruded sheet 310 that is moved along the surface of the third guide roller 445 may be additionally pressed while passing through the pressing roller unit to further increase flatness.

Since the extruded sheet 310 is heat-fused with the first film part 320 and the second film part 330 and does not require an additional adhesive, the extruded sheet may be formed with a thickness less than or equal to the sum of the thickness of the first film part 320 and the thickness of the second film part 330.

In other words, the extruded sheet 310 may be formed to a thickness of approximately 434 μm to 567 μm. For example, the extruded sheet 310 may be formed to a thickness of 50 mm.

The extruded sheet 310 may be wound in a roll state, and after the adhesive part 340 is laminated, the extruded sheet 310 may be transferred for cutting and patterning processes to enable continuous cutting and patterning processing.

As illustrated in FIG. 10, the composite film fabric 300a wound in a roll state is cut into a shape attachable to the grill pan body 200 by the press device 500, and at the same time, an exhaust groove 343 can be formed.

The press device 500 may include a fifth guide roller 510 and a sixth guide roller 530 for supplying and discharging the composite film fabric 300a, and a press 520 for cutting and patterning the composite film fabric 300a between the fifth guide roller 510 and a sixth guide roller 530.

In detail, the composite film fabric 300a wound in a roll state may be supplied to a press 520 by the fifth guide roller 510. In this case, the composite film fabric 300a may refer to a form in which the exhaust groove 343 is not formed with the adhesive part 340 attached to the extruded sheet 310.

A pair of fifth guide rollers 510 may be provided vertically and the composite film fabric 300a may be supplied to the press 520 while the composite film fabric 300a passes through between the pair of the fifth guide rollers 510.

In other words, the pair of the fifth guide rollers 510 can precisely supply the composite film fabric 300a to the press 520, and together with the sixth guide roller 530, the extruded sheet 310 can be transferred precisely.

The press 520 may be configured to be capable of cutting and patterning the composite film fabric 300a by a vertically moving mold. The mold may include a pattern mold 521 and a cutting mold 522.

In detail, the composite film fabric 300a transferred to the press 520 may be patterned by the press 520. A pattern for exhausting air generated when the composite film 300 adheres to the lower surface of the composite film fabric 300a, that is, the adhesive part 340 may be formed. The pattern may be referred to as an exhaust groove 343.

The exhaust groove 343 may be formed by the pattern mold 521 of the press 520. In other words, the pattern mold 521 presses the adhesive part 340 of the composite film fabric 300a by the vertically moving press 520. The exhaust groove 343 may be formed as a whole in the lower surface of the composite film fabric 300a, that is, in the adhesive part 340, by the pattern mold 521. Depending on the shape of the pattern mold 521, the exhaust groove 343 may be formed in various shapes but basically may be formed in a groove shape extending from one end to the other end of the extruded sheet 310 along the short width direction of the extruded sheet 310.

At this time, the lower surface of the composite film 300 pressed by the pattern mold 521, that is, the adhesive part 340 may be formed of foam-molded urethane foam material. Therefore, the exhaust groove 343 may be formed by the pressure of the pattern mold 521, and the molded exhaust groove 343 may be maintained even after the composite film 300 is attached to the grill pan body 200.

When the exhaust groove 343 is molded by the pattern mold 521 of the press 520, the composite film fabric 300a is may be moved toward the cutting mold 522 by the fifth guide roller 510 and the sixth guide roller 530.

The extruded sheet 310 transferred to the position of the cutting mold 522 may be cut by the cutting mold 522 of the press 520. At this time, the cutting of the extruded sheet 310 may not be cut in the form of a complete piece but may be Thompson processing in which an operator tears off and cuts to a degree that can be separated from the scrap 300b. Of course, the extruded sheet 310 may be completely cut in an attachable shape.

By the press 520, the composite film fabric 300a may be cut into a hole shape such as the film opening 302 and a shape corresponding to the shape of the grill pan body 200 at once. In other words, the overall shape can be formed at once by the cutting mold 522 that is moved vertically.

Of course, in the press 520, when the pattern mold 521 and the cutting mold 522 are configured in the form of a single mold, the composite film fabric 300a is not transferred within the press 520 and the formation and cutting of the exhaust groove 343 may be possible at the same time.

In addition, when a plurality of presses 520 are configured in parallel between the fifth guide roller 510 and the sixth guide roller 530, the pattern mold 521 and the cutting mold 522 may be placed in sequence in each press 520 and thus the composite film fabric is processed sequentially.

Meanwhile, the composite film fabric 300a in the state of molding the exhaust groove 343 and being cut into a shape attachable to the grill pan body 200 by the press 520 can be discharged continuously by the sixth guide roller 530.

At this time, the composite film fabric 300a is discharged as a state of being partially cut by the Thomson processing of the press 520 by the sixth guide roller 530 and then separated from the scrap 300b so that the composite film 300 may be finally completed. The composite film 300 separated from the scrap 300b may be molded in the form of a sheet attachable to the grill pan body 200, and the composite film 300 which is molded and then in a state of immediately before being attached to the grill pan body 200 may be referred to as a composite sheet or a composite film sheet.

Hereinafter, the structure of the processed composite film 300 will be described in more detail with reference to the drawings.

Figure 11:
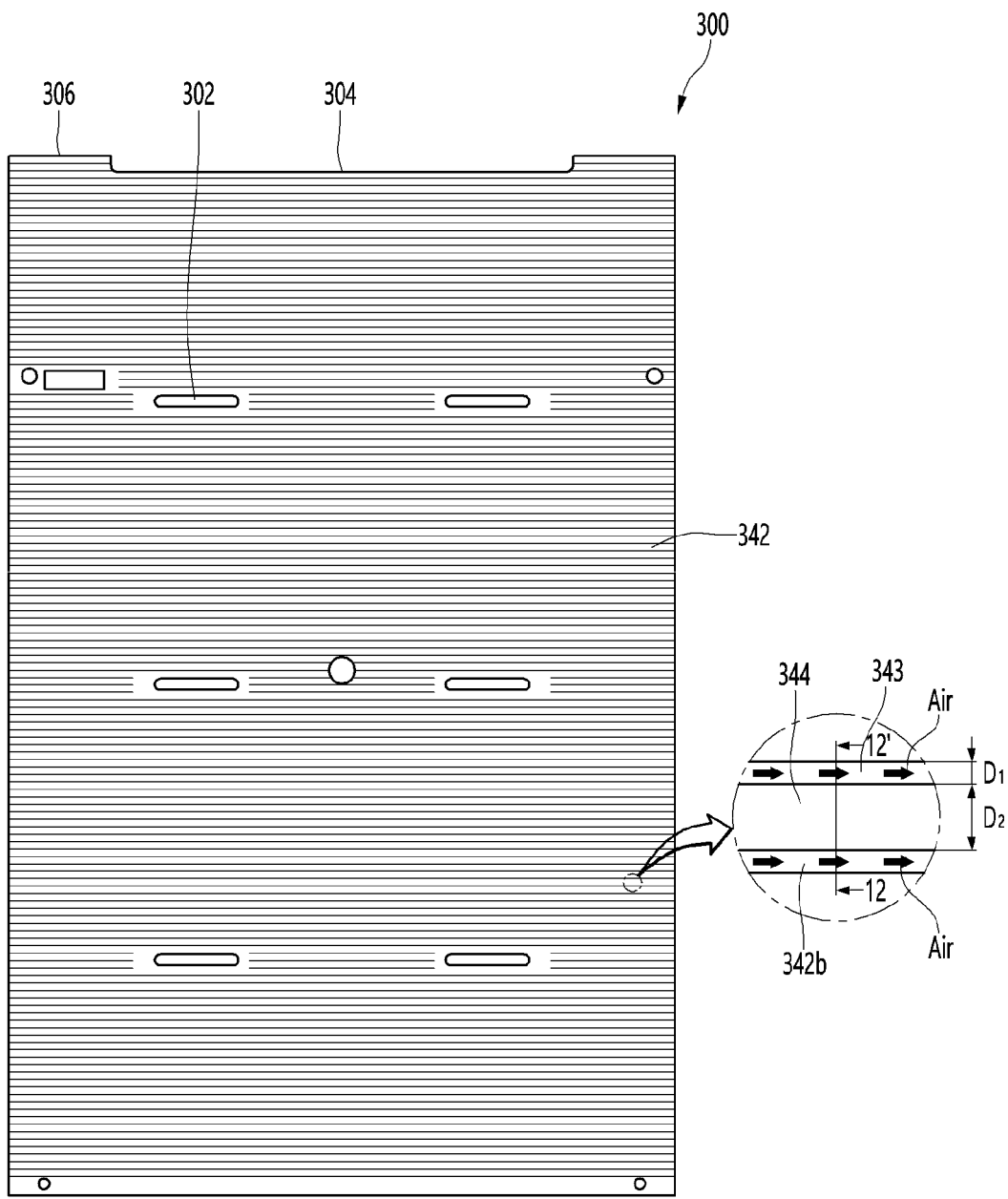
FIG. 11 is a view illustrating a back surface of the composite film.
Figure 12:
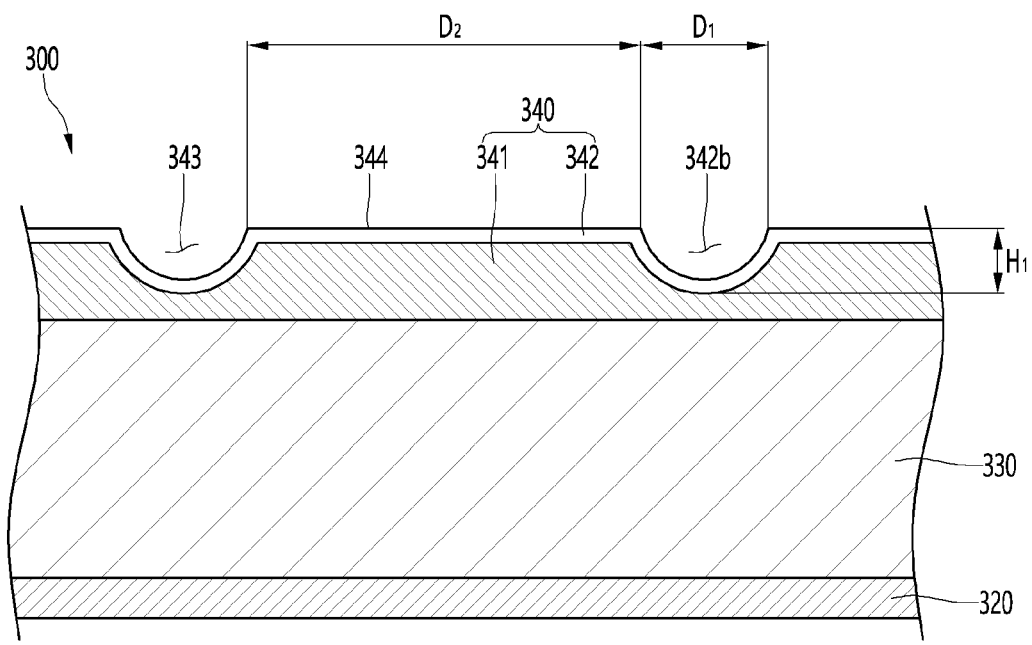
FIG. 12 is a sectional view taken along 12-12' of FIG. 11.
Figure 13:
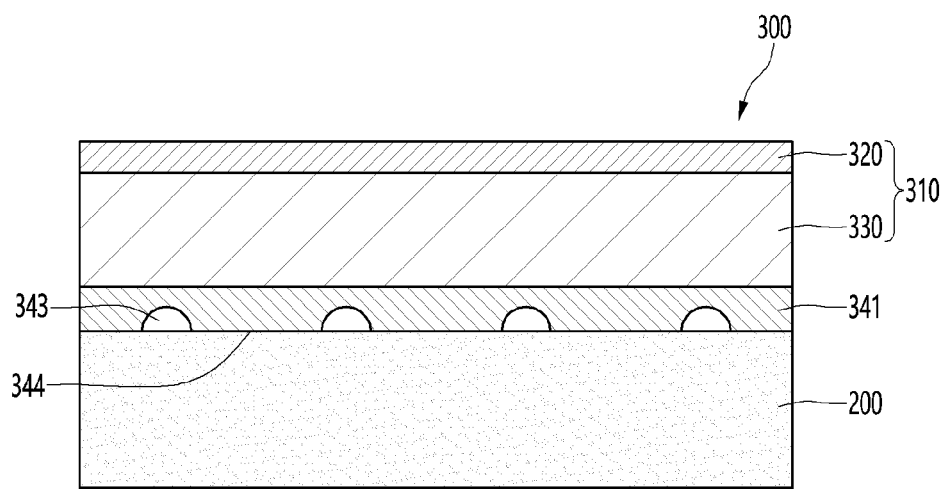
FIG. 13 is a sectional view illustrating a state where the composite film is attached to a grill pan body.

FIG. 11 is a view illustrating the back surface of the composite film, FIG. 12 is a sectional view taken along 12-12' of FIG. 11, and FIG. 13 is a sectional view illustrating a state where the composite film is attached to the grill pan body.

As illustrated in the drawing, the processed composite film 300 may be attached to the grill pan 100, and at this time, the lower surface of the composite film 300 may be constituted by an adhesive part 340.

In addition, the exhaust groove 343 may be formed on the entire lower surface of the composite film 300. The exhaust groove 343 is formed in the adhesive part 340 forming the lower surface of the composite film 300, and the exhaust grooves 343 can be formed both in the adhesive layer 341 and in the protective film 342 constituting the adhesive part 340.

The composite film 300 is attached to a part having a wide surface such as the grill pan body 200, and the exhaust groove 343 is formed to extend in the horizontal direction and may be continuously formed at the preset interval in the vertical direction so that air bubbles that may be generated during the attachment process can be smoothly exhausted.

In detail, the exhaust groove 343 may extend in a horizontal direction having a shorter width among horizontal and vertical directions of the composite film 300. In other words, the exhaust groove 343 may be formed along a direction in which the length of the composite film 300 is short.

The exhaust groove 343 may extend from one end to the other end of the composite film 300 and is formed so that both ends of the exhaust groove 343 can be exposed through both ends of the composite film 300. At this time, the depth H1 of the exhaust groove 343 may be formed to be approximately 0.1 mm to 0.2 mm, and the diameter D1 of the exhaust groove 343 may be formed to be approximately 1 mm.

The exhaust groove 343 may be formed to maintain a groove shape in which air bubbles can be smoothly exhausted even when the composite film 300 is attached to the grill pan body 200. In other words, in the state where the composite film 300 is attached, the exhaust groove 343 may be reduced in size by about 10% to 20% by the pressure when the composite film 300 is attached, but air bubbles and air between the composite film 300 and the grill pan body 200 may be smoothly exhausted.

In addition, a plurality of the exhaust grooves 343 may be continuously formed at preset intervals. For example, the exhaust groove 343 may have an interval D2 of about 4 mm to 6 mm in order to ensure the adhesive ability of the adhesive layer 341. In other words, the exhaust groove 343 may be formed at regular intervals D2 on the lower surface of the composite film 300, and the lower surface of the composite film 300 may be formed by the adhesive surface 344 between the exhaust groove 343 and the exhaust groove 343. Therefore, the adhesive surface 344 in which the exhaust groove 343 is not formed is completely in close contact with the grill pan body 200 so that the composite film 300 can maintain an adhesive state with the grill pan body 200.

Meanwhile, in order for the composite film 300 to be attached to the grill pan body 200, the protective film 342 is first removed. When the protective film 342 is removed, the adhesive layer 341 in the state where the exhaust groove 343 is formed may be exposed, and the composite film 300 is disposed so that the adhesive layer 341 may contact the front surface of the grill pan body 200. Then, the composite film 300 is pressed and adheres to the grill pan body 200.

As illustrated in FIG. 13, even when the composite film 300 is attached to the grill pan body 200, the exhaust groove 343 maintains a space spaced apart from the front surface of the grill pan body 200, and the adhesive surface 344 is maintained in a state of adhering to the grill pan body 200. Therefore, when the composite film 300 adheres, the operator may exhaust air bubbles or air through the exhaust groove 343.

In detail, in the process of attaching the composite film 300 to the front surface of the grill pan body 200, bubbles are generated due to the structural characteristics of the composite film 300 attached to a wide surface, but as illustrated in FIG. 11, air bubbles and air may be exhausted along the exhaust groove 343 formed on the lower surface of the composite film 300.

At this time, since the exhaust groove 343 is formed in a horizontal direction having a short width, the operator can simply discharge air bubbles or air to the outer end part of the composite film 300 by sweeping air bubbles or air in the horizontal direction while pressing the composite film 300.

As such, the adhesion of the composite film 300 can be simply performed by a user's manual operation. Therefore, the operator can directly attach the composite film 300 without going through a complicated process such as lamination using a press roller, thereby increasing productivity and reducing manufacturing cost.

Meanwhile, the composite film 300 of the present invention may have various other embodiments in addition to the embodiment described above.

Figure 14:
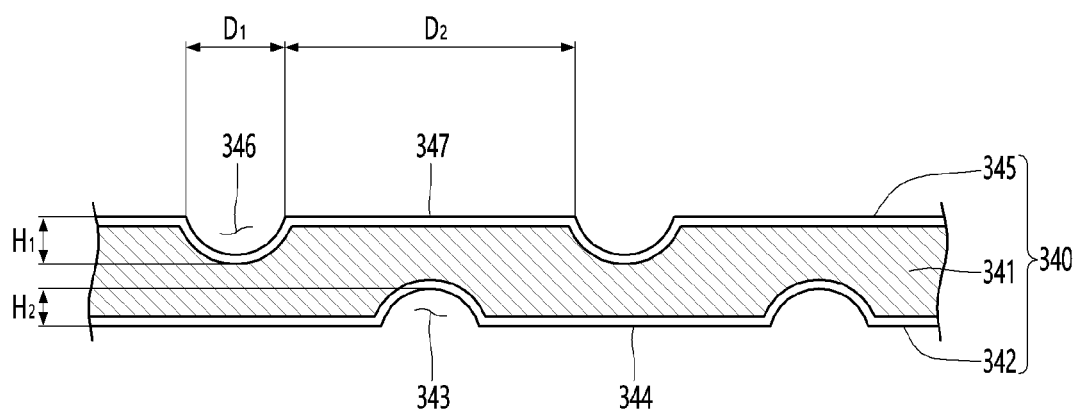
FIG. 14 is a sectional view illustrating another example of an adhesive part according to an embodiment of the present invention.
Figure 15:
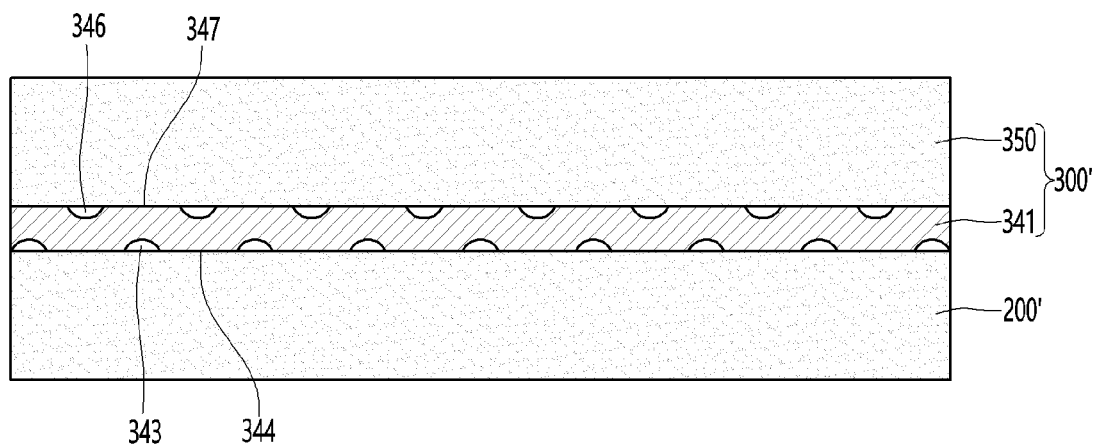
FIG. 15 is a sectional view illustrating a composite sheet according to another embodiment of the present invention.

FIG. 14 is a sectional view illustrating another example of an adhesive part according to an embodiment of the present invention, and FIG. 15 is a sectional view illustrating a composite sheet according to another embodiment of the present invention.

As illustrated in the drawing, the composite film 300' according to another embodiment of the present invention may include an adhesive part 340 attached to an injection product and an exterior part 350 on the upper surface of the adhesive part 340.

In detail, the exterior part 350 may be formed of a film or thin plate material having various textures other than metal. In addition, the exterior part 350 may be made of various materials capable of adhering to the adhesive part 340 and forming the outer appearance of home appliances. For example, the exterior part 350 may be made of various materials such as a wood film and a thin glass plate.

In addition, the adhesive part 340 may include an adhesive layer 341 identical to the adhesive layer 341 described above, and an upper protective film 343 and a lower protective film 342 protecting the upper and lower surfaces of the adhesive layer 341. In other words, the adhesive part 340 may not be attached to the exterior part 350 by a lamination process using a press roll but may be separately molded and then attached to the exterior part 350 by a user's manual operation.

At this time, the adhesive part 340 may be cut at the same time as the pattern molding of each of the exhaust grooves 343 by the press device 500 as in the embodiment described above.

However, in the adhesive part 340, an upper exhaust groove 346 is formed on the upper surface, and an exhaust groove 343 is formed on the lower surface so that exhaust grooves 343 can be formed on both surfaces of the adhesive part 340. At this time, the diameter D1 of the upper exhaust groove 346 and the lower exhaust groove 343 may be the same as the embodiment described above, and the width of the adhesive surfaces 344 and 347 between the exhaust grooves 343, that is, the interval D2 between the exhaust grooves 343 and 346 may also be the same. In addition, the depths H1 and H2 of the exhaust grooves 343 and 346 may also be the same.

However, the upper exhaust groove 346 and the lower exhaust groove 343 may be alternately disposed so as not to overlap each other. For example, a lower exhaust groove 343 may be formed on a rear surface corresponding to a central part between the continuous upper exhaust grooves 346.

The adhesive part 340 may adhere to the exterior part 350 by removing the upper protective film 345 and may be attached to the injection product 200' constituting the home appliance by removing the lower protective film 342. The injection product 200' may have various configurations that form the outer appearance shape of home appliances, such as the grill pan body 200 of the embodiment described above.

Since the adhesive part 340 is in a state where the upper exhaust grooves 346 and the lower exhaust grooves 343 are formed on both the upper and lower surfaces, air bubbles and air can be simply exhausted on the adhesive surface between the exterior part 350 and the injection product 200' by manual operation of the operator.

Figure 16:
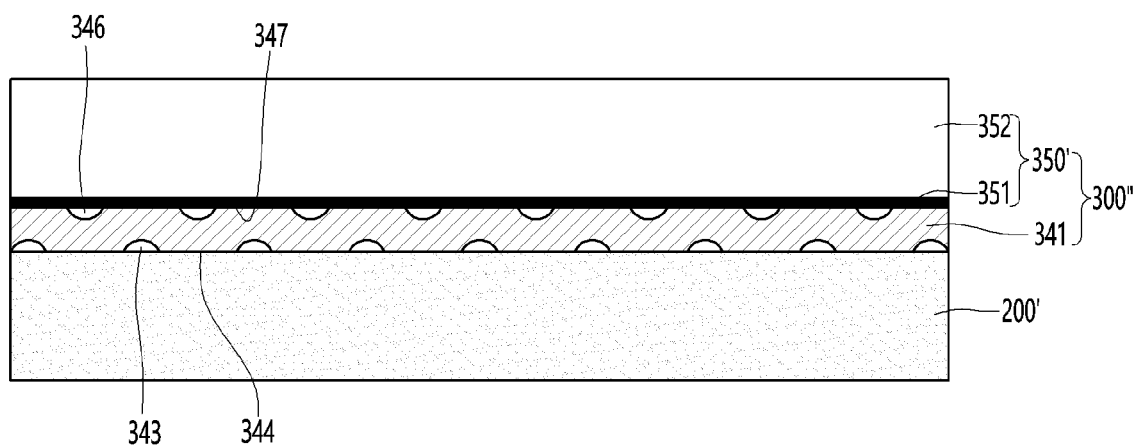
FIG. 16 is a sectional view illustrating a composite sheet according to another embodiment of the present invention.

FIG. 16 is a sectional view illustrating a composite sheet according to another embodiment of the present invention.

As illustrated, the composite film 300" according to another embodiment of the present invention may include an adhesive part 340 attached to the injection product 200' and an exterior part 350' on the upper surface of the adhesive part 340.

In this case, the exterior part 350' may include a transparent layer 351 formed of glass or transparent plastic material and a printing layer 352 formed on a lower surface of the transparent layer 351. The printing layer 352 may be formed to print a specific color or pattern, text, picture, or the like. Therefore, the outer appearance of home appliances seen from the outside can be made more colorful.

The adhesive part 340 may be attached to the lower surface of the exterior part 350' described above. Since the structure and attachment method of the adhesive part 340 is completely the same as the structure described in FIGS. 14 and 15, a detailed description thereof will be omitted.

Meanwhile, the composite films 300, 300', 300" as in the embodiments described above may be applied to various home appliances, and representative examples will be described below.

Figure 17:
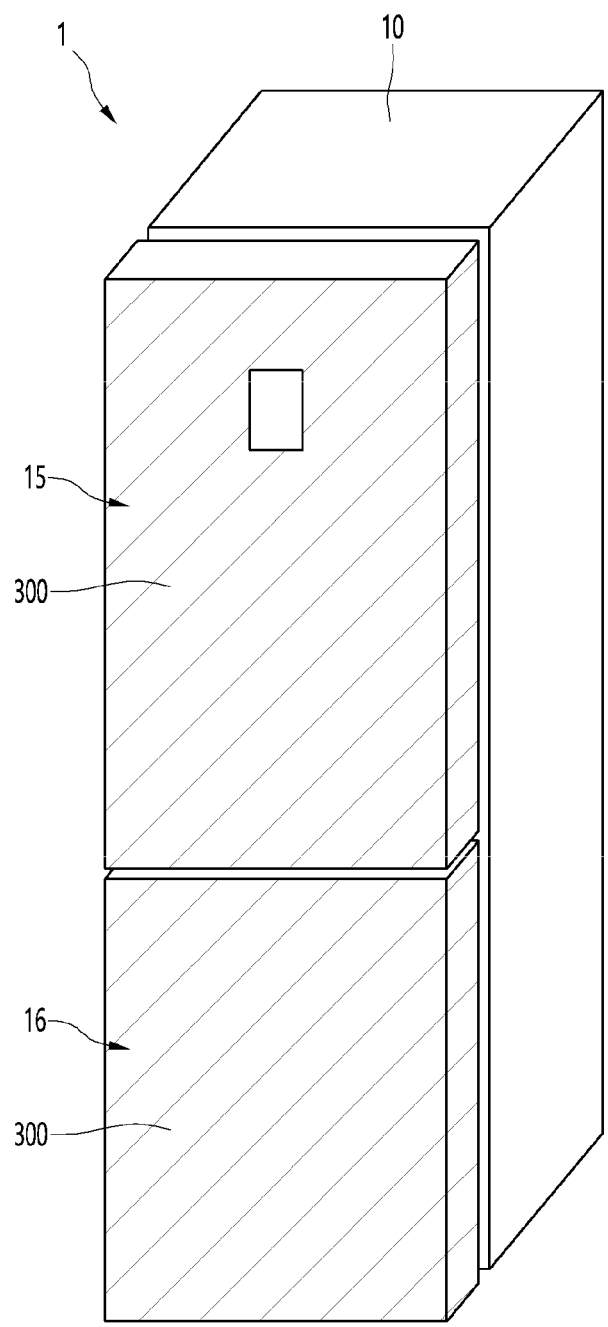
FIG. 17 is a view illustrating a state where a composite film according to an embodiment of the present invention is applied to a door of a refrigerator.

FIG. 17 is a view illustrating a state where a composite film according to an embodiment of the present invention is applied to a door of a refrigerator.

As illustrated in the drawings, the refrigerator 1 may have an outer appearance formed by cabinets 10 and doors 15 and 16 forming a storage space as in the embodiment described above. The storage space of the cabinet 10 may be composed of an upper storage space and a lower storage space, and the door can be composed of an upper door 15 for opening and closing the upper storage space and a lower door 16 for opening and closing the lower storage space.

The doors 15 and 16 form a front outer appearance of the refrigerator 1 in a closed state, and when the refrigerator 1 is installed, the doors 15 and 16 may be exposed to the front. Accordingly, the overall outer appearance of the refrigerator 1 may be influenced by the outer appearance shape of the doors 15 and 16.

Accordingly, the composite film 300 may be provided on the outer surface of the door of the refrigerator 1. In other words, the composite film 300 is entirely attached to the front surface of the plate forming the outer appearance of the doors 15 and 16 of the refrigerator 1 to form the outer appearance of the refrigerator doors 15 and 16. Through the attachment of the composite film 300, the refrigerator doors 15 and 16 may exhibit various colors and textures as a whole and may be configured to display a luxurious texture.

Figure 18:
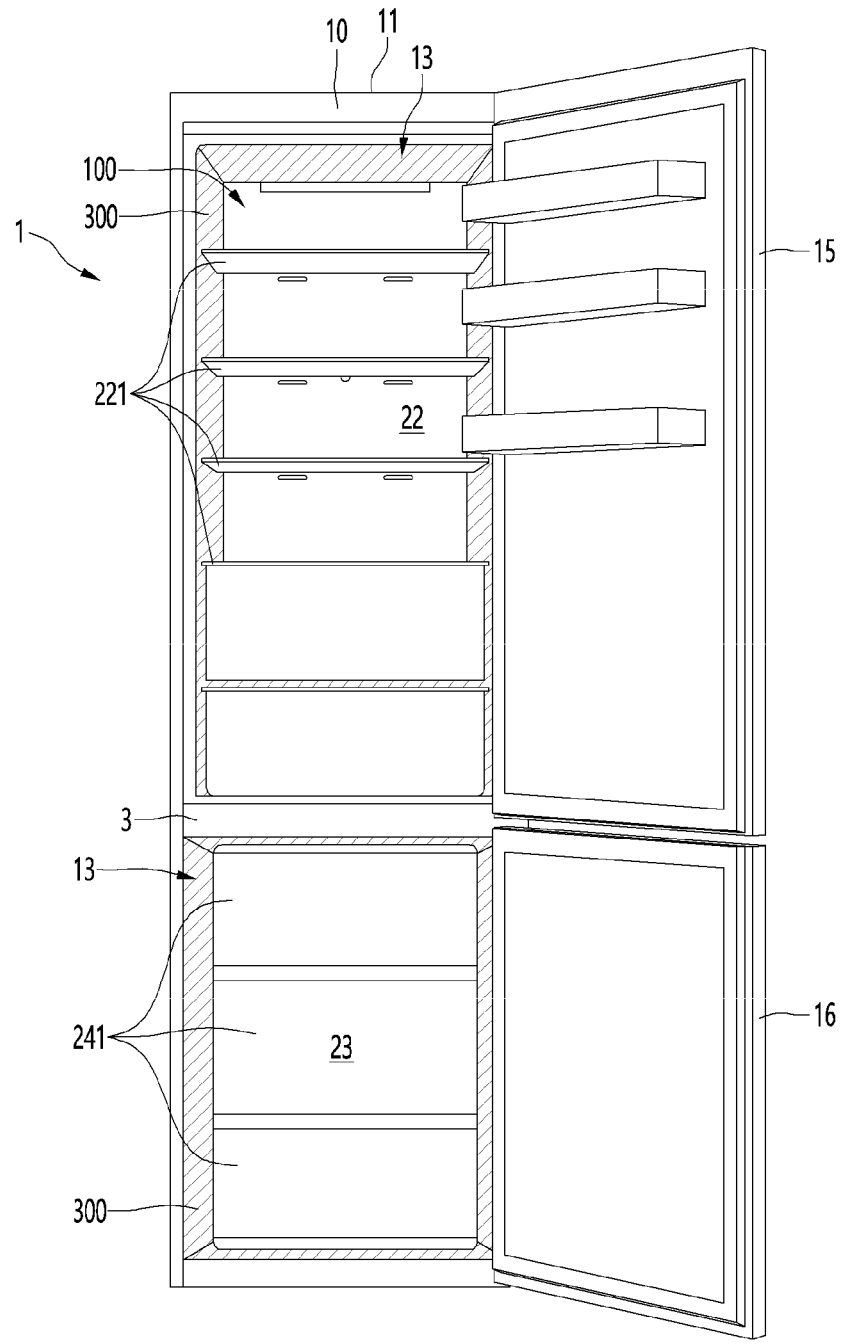
FIG. 18 is a view illustrating a state where a composite film according to an embodiment of the present invention is applied to an inside surface of a storage space.

FIG. 18 is a view illustrating a state where a composite film according to an embodiment of the present invention is applied to the inside surface of a storage space.

As illustrated in the drawings, the outer appearance of the refrigerator 1 may be formed by a cabinet 10 and a door forming the storage spaces 22 and 23 as in the embodiment described above. The storage spaces 22 and 23 of the cabinet 10 may be composed of an upper storage space 22 and a lower storage space 23, and the doors 15 and 16 may be composed of an upper door 15 that opens and closes the upper storage space 22 and a lower door 16 that opens and closes the lower storage space 23.

In addition, the cabinet 10 may be configured to include an outer case 11 forming an outer appearance, an inner case 13 forming the interior of the storage space, and insulating material (not illustrated) filling between the outer case 11 and the inner case 13.

The inner case 13 may be formed by plastic injection and may include the composite film 300. In other words, the composite film 300 may be attached to the outer surface of the injection product forming the shape of the inner case to form the outer appearance of the inner case 13.

In addition, in the interior of the storage spaces 22 and 23 formed by the inner case 13, the outer appearance may be formed by the composite film 300. As an example, the composite film 300 may have a metal-like outer appearance and texture as in the embodiment described above.

When the interior of the storage spaces 22 and 23 has a texture such as metal, especially stainless, the interior thereof can be seen more clearly, and the interior thereof can look as if it is maintaining a lower temperature through the unique texture of the metal.

Figure 19:
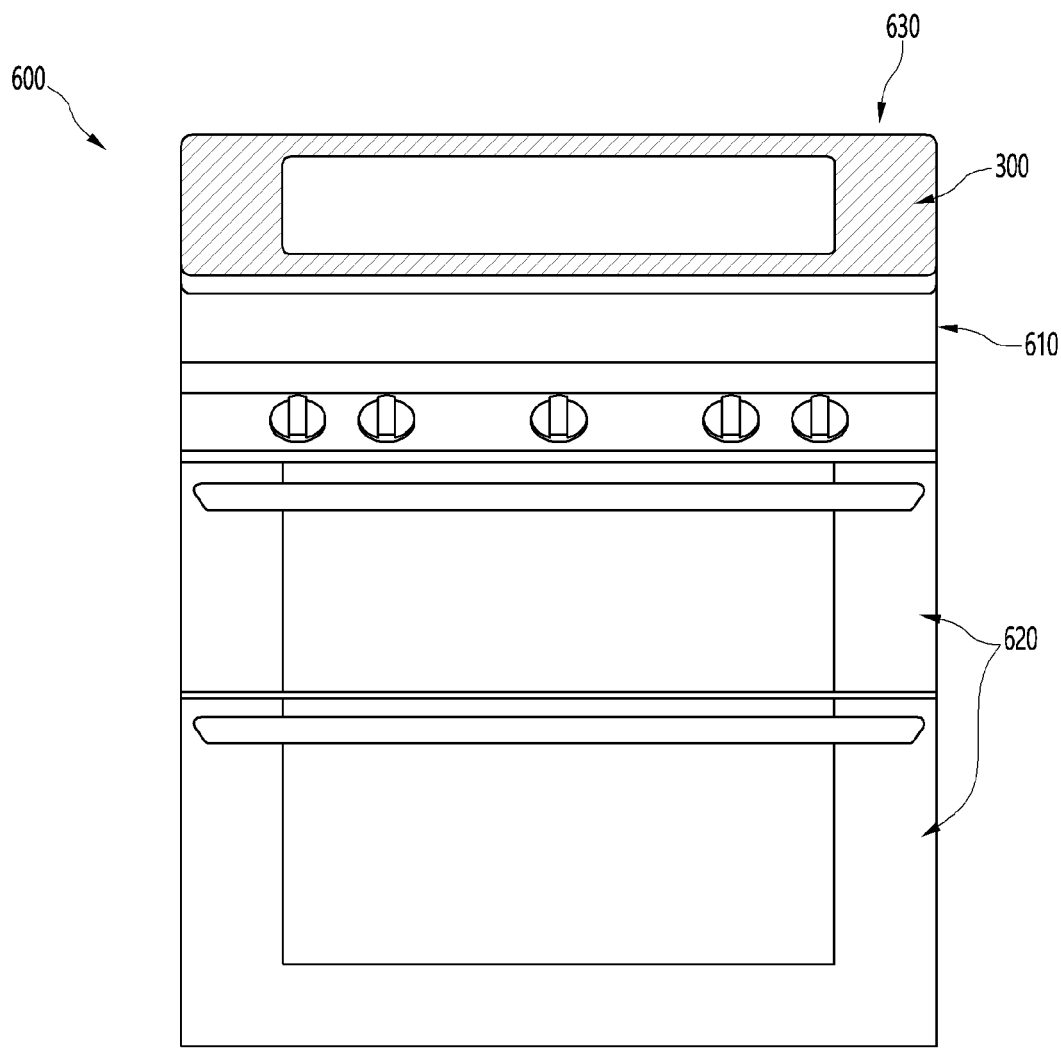
FIG. 19 is a view illustrating a state where a composite film according to an embodiment of the present invention is applied to a cooking appliance.

FIG. 19 is a view illustrating a state where a composite film according to an embodiment of the present invention is applied to a cooking appliance.

As illustrated in the drawing, a cooking appliance 600 to which the composite film 300 according to the embodiment of the present invention is applied may have a structure such as a gas oven.

The cooking appliance 600 may have the cooking space formed in the main body 610, and a door 620 for opening and closing the cooking space may be provided in front of the cooking space. In addition, although not illustrated in detail, a cooktop part such as a gas stove may be formed on the upper surface of the main body 610.

In such a cooking device 600, the main body 610 and the door 620 may be formed of a metal material due to the characteristics of the structure of cooking food by heating.

In addition, a manipulation part 630 may be further formed on an upper surface of the cooking appliance 600. The manipulation part 630 may include a display displaying the operating state of the cooking appliance 600, a plurality of buttons for setting the operation, and the like. The manipulation part 630 may extend upward from the rear end of the top surface of the cooking appliance 600.

The operation part 630 may be formed by injection molding of a plastic material due to the characteristics of a structure in which a plurality of electronic components are disposed and protrudes. In addition, the composite film 300 may be provided on the front surface of the manipulation unit 630. The composite film 300 forms the entire surface of the injection-formed manipulation part 630 and may be formed to have a metallic texture as in the embodiment described above.

Accordingly, the outer appearance of the manipulation part 630 may look like metal and may form an outer appearance that has a sense of unity with the main body 610 and the door 620 made of metal material.

In particular, the cooking appliance 600 may generate heat due to the characteristics of cooking food through heating, and the composite film 300 may also be exposed to a high temperature environment by such heat. As a result, the solvent component included in the adhesive layer 323 or the adhesive layer 341 constituting the composite film 300 may be evaporated by increasing the temperature, thereby expanding the composite film 300. However, the composite film 300 has a structure in which air can be discharged through the exhaust groove 343 so that the composite film 300 can maintain an adhesive state without being swollen or bent, and the outer appearance to which the composite film 300 is attached may be maintained in a smooth state.

Figure 20:
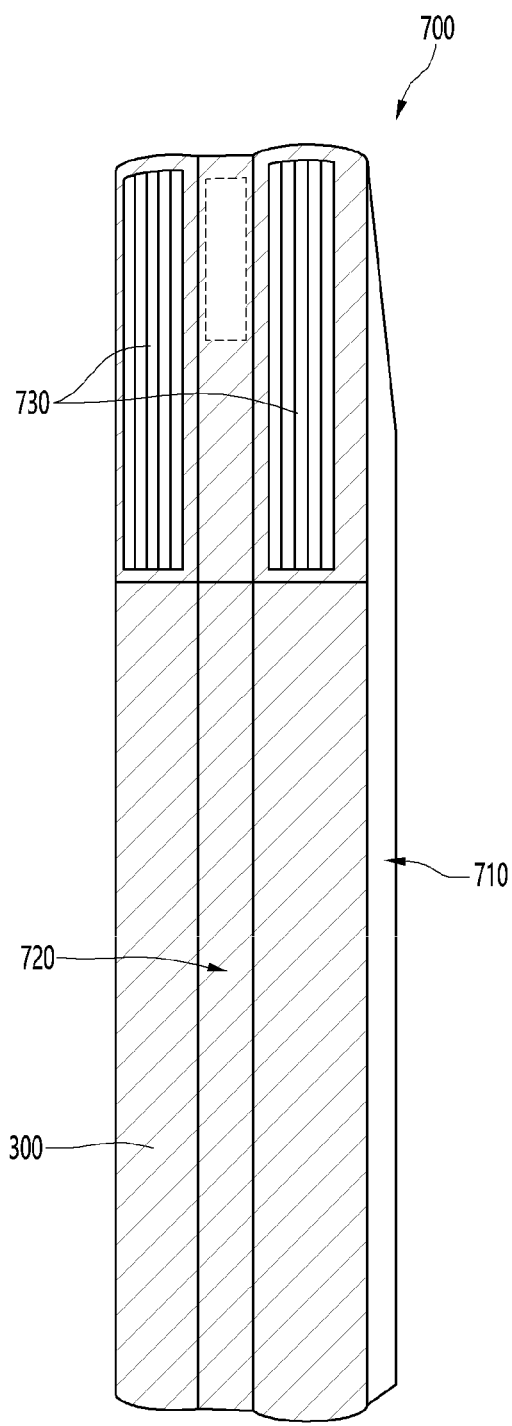
FIG. 20 is a view illustrating a state where a composite film according to an embodiment of the present invention is applied to an air conditioner.

FIG. 20 is a view illustrating a state where a composite film according to an embodiment of the present invention is applied to an air conditioner.

As illustrated in the drawing, the outer appearance of the air conditioner 700 to which the composite film 300 according to the embodiment of the present invention is applied may be formed by a case 710 in which a heat exchanger and a fan are received, and a front panel 720 which is mounted on the front surface of the case 710 and thus forms front outer appearance. The front panel 720 may be configured such that a plurality of panels are coupled to each other to form at least a part of the front outer appearance of the air conditioner 700.

In addition, a discharge port 730 for discharging heat-exchanged air into the indoor space may be formed in the front panel 720. In addition, although not illustrated in detail, a suction port (not illustrated) through which indoor air is sucked may be formed in the front panel 720 or the case 710.

Meanwhile, in the air conditioner 700, the front surface of the front panel 720 may be formed of a composite film 300 to form a luxurious outer appearance. In other words, the front panel 720 may be formed by a plastic injection product, and the composite film 300 may be attached to the front surface of the plastic injection product. For example, the composite film 300 may have a metallic texture as in the embodiment described above.

In addition, when the composite film 300 is attached to the entire front panel 720 that forms a wide surface as a whole, air bubbles and air can be exhausted through the exhaust groove 343, so that the outer appearance of the front panel 720 may be clearly visible.

Of course, the composite film 300 may be attached to the front panel 720 and the outer surface of the case 710 that is injection-formed if necessary to form the outer appearance.

The composite film for a home appliance and the refrigerator with the composite film attached according to an embodiment of the present invention can expect the following effects.

According to an embodiment of the present invention, when the composite film is attached to an injection product constituting a wide outer appearance of the surface, air bubbles generated between the composite film and the injection product can be easily discharged through the exhaust groove.

Accordingly, even if the composite film is attached to a wide surface, the outer appearance thereof is not protruded or bent by air bubbles, the surface thereof is smooth, and the flat shape is maintained so that a refrigerator in which the outer appearance quality is improved can be provided.

In particular, the refrigerator has a structure in which the exhaust groove is formed on the adhesive part of the acrylic foam material so that the exhaust groove can be molded without causing shape deformation due to the exhaust groove on the surface of the composite film, and thus there is an advantage that can maintain the outer appearance and improve the exhaust performance.

In addition, the exhaust grooves are disposed at equal intervals at set intervals, so that even if a non-adhesive part is generated by the exhaust grooves, the composite film can maintain the adhesive state to the injection product.

In addition, even when the composite film is attached, the exhaust groove is evenly distributed over the entire adhesive part, and the exhaust groove extends in the short width direction of the composite film so that the operator can sweep the air bubbles between the composite film and the injection product in the extension direction of the exhaust groove to exhaust air bubble without a separate tool, and thus the effect of improving the attachment workability can be expected.

In particular, the composite film has a structure that is inevitable to generate air bubbles because the composite film is attached to a wide surface, but there is an advantage in that the air bubbles are easy to exhaust through the exhaust groove so that the operator can manually attach the composite film, the attaching operation of the composite film can be performed very quickly without operating additional equipment, manufacturing cost can be reduced, and productivity can be significantly improved.

In addition, the composite film may be formed by pattern processing to form the exhaust groove by press processing of the composite film fabric continuously supplied, and cutting processing to cut according to the attachment shape, and thus there is an advantage that both forming of the exhaust groove and cutting processing are possible.

In particular, the composite film fabric may be continuously supplied to the press device in a roll state, and continuous pattern processing and cutting processing are possible by the press device, thereby remarkably improving productivity.

What is claimed is:

1. A composite film for an appliance comprising:
   a first film part at least partially made of a metal material and configured to form an outer appearance of the appliance;
   a second film part provided at a surface of the first film part and made of a resin material; and
   an adhesive part provided at a surface of the second film part and configured to adhere to an injection product of the appliance, wherein a plurality of exhaust grooves are defined in the adhesive part, the plurality of exhaust grooves being (i) recessed in and extending across the adhesive part and (ii) configured to discharge air between the adhesive part and the injection product.

2. The composite film for the appliance of claim 1, wherein both ends of the plurality of exhaust grooves are open at both ends of the composite film.

3. The composite film for the appliance of claim 1, wherein the plurality of exhaust grooves are disposed at equal intervals over the entire adhesive part.

4. The composite film for the appliance of claim 3, wherein a width of an exhaust groove of the plurality of exhaust grooves is smaller than an interval between the exhaust groove and an exhaust groove adjacent thereto.

5. The composite film for the appliance of claim 1, wherein the plurality of exhaust grooves extend along a width direction of the composite film.

6. The composite film for the appliance of claim 5, wherein the plurality of exhaust grooves are continuously formed at equal intervals along a length direction of the composite film.

7. The composite film for the appliance of claim 1, wherein the adhesive part comprises:
   an adhesive layer attached to the second film part and made of foamed acrylic foam; and
   a protective film layer attached to the adhesive layer to protect the adhesive layer,
   wherein the plurality of exhaust grooves are formed by recessing the protective film layer and the adhesive layer.

8. The composite film for the appliance of claim 7, wherein the protective film layer is configured to be removed to thereby adhere the adhesive layer to the injection product.

9. The composite film for the appliance of claim 7, wherein the adhesive layer has a thickness of 0.3 mm to 0.5 mm, and
   wherein an exhaust groove of the plurality of exhaust grooves has a depth of 0.1 mm to 0.2 mm.

10. The composite film for the appliance of claim 7, wherein the plurality of exhaust grooves are configured to maintain their shape when the adhesive layer is adhered to the injection product.

11. The composite film for the appliance of claim 7, wherein the plurality of exhaust grooves is provided on both surfaces of the adhesive layer and are open toward the second film part and the surface of the injection product.

12. The composite film for the appliance of claim 1, wherein the first film part comprises:
   a metal layer;
   a polyethylene terephthalate (PET) layer adhered to a first surface of the metal layer to protect the first surface of the metal layer;
   a primer layer applied to a second surface of the metal layer and adhered to the second film part; and
   a coating layer adhered to the PET layer to protect the PET layer,
   wherein the PET layer is positioned between the coating layer and the metal layer.

13. The composite film for the appliance of claim 1, wherein the second film part is made of ABS resin and is formed by insert extrusion with the first film part.

14. A composite film that is attached to an injection product of an appliance to form an outer appearance of the appliance, the composite film comprising:
   an exterior part that forms the outer appearance, color and texture of the appliance; and
   an adhesive part adhering to a surface of the exterior part and adhering to an outer surface of the injection product of the appliance,
   wherein the adhesive part defines a plurality of exhaust grooves recessed to open toward the outer surface of the injection product, and
   wherein the plurality of exhaust grooves extends across the composite film and is configured to discharge air between the adhesive part and the outer surface of the injection product, and wherein both ends of the plurality of exhaust grooves are open at both ends of the composite film.

15. The composite film for the appliance of claim 14, wherein the exterior part comprises:
   a transparent layer made of a transparent glass or plastic material; and
   a printing layer on which one or more of a specific color, pattern, shape, or character is printed, wherein the printing layer adheres to an adhesive layer.

16. The composite film for the appliance of claim 14, wherein the exterior part is a film material.

17. A refrigerator that is coated with a composite film according to claim 1, the refrigerator comprising:
   a cabinet that defines a storage space;
   a door configured to open and close a front surface of the storage space and is rotatably provided on one side of the cabinet; and
   a grill pan that defines a rear wall of the storage space and comprises a cold air discharge hole configured to discharge cold air to the storage space,
   wherein the grill pan comprises:
      a grill pan body comprising a plurality of injection products; and
      a composite film according to claim 1 attached to a front surface of the grill pan body.

18. The refrigerator with the composite film attached of claim 17,
   wherein the grill pan comprises a body opening configured to discharge cool air into the storage space, and
   wherein the composite film comprises a film opening defined in a position corresponding to the body opening.

19. A refrigerator comprising:
   a cabinet that defines a storage space; and
   a door configured to open and close a front surface of the storage space and is rotatably provided on one side of the cabinet,
   wherein a composite film according to claim 1 is attached to a front surface of the door.

20. A refrigerator comprising:
   a cabinet that defines a storage space; and
   a door configured to open and close a front surface of the storage space and is rotatably provided on one side of the cabinet,
   wherein a composite film according to claim 1 is attached to an inner surface of the storage space.

* * * * *